US006985589B2

(12) United States Patent
Morley et al.

(10) Patent No.: US 6,985,589 B2
(45) Date of Patent: Jan. 10, 2006

(54) APPARATUS AND METHOD FOR ENCODING AND STORAGE OF DIGITAL IMAGE AND AUDIO SIGNALS

(75) Inventors: Steven A. Morley, Escondido, CA (US); Juan Faus, San Diego, CA (US); John Ratzel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/564,174

(22) Filed: May 3, 2000

(65) Prior Publication Data

US 2003/0206635 A1 Nov. 6, 2003

Related U.S. Application Data

(60) Provisional application No. 60/168,605, filed on Dec. 2, 1999.

(51) Int. Cl.
*G06F 17/00* (2006.01)

(52) U.S. Cl. .................... 380/269; 725/145; 382/234
(58) Field of Classification Search ............... 380/31, 380/255–257, 200–271; 382/232–234; 725/144–145, 725/8–9; 713/168, 200–202; 370/536; 352/133; 728/94–139; 709/200–247; 348/552; 375/240
See application file for complete search history.

(56) References Cited

U.S. PATENT DOCUMENTS

| | | | |
|---|---|---|---|
| 5,021,891 A | | 6/1991 | Lee |
| 5,107,345 A | | 4/1992 | Lee |
| 5,452,104 A | | 9/1995 | Lee |
| 5,815,671 A | * | 9/1998 | Morrison .................... 709/247 |
| 5,838,314 A | * | 11/1998 | Neel et al. ..................... 725/8 |
| 5,867,208 A | * | 2/1999 | McLaren .................... 725/139 |
| 5,914,712 A | * | 6/1999 | Sartain et al. ................. 725/9 |
| 6,137,834 A | * | 10/2000 | Wine et al. ................. 375/240 |
| 6,141,630 A | * | 10/2000 | McNamara et al. .......... 703/14 |
| 6,172,712 B1 | * | 1/2001 | Beard ......................... 348/552 |
| 6,208,745 B1 | * | 3/2001 | Florencio et al. ........... 382/100 |
| 6,266,418 B1 | * | 7/2001 | Carter et al. ................ 380/257 |
| 6,275,588 B1 | * | 8/2001 | Videcrantz et al. ......... 380/255 |
| 6,330,334 B1 | * | 12/2001 | Ryan .......................... 380/269 |
| 6,378,129 B1 | * | 4/2002 | Zetts ........................... 725/94 |
| 6,384,893 B1 | * | 5/2002 | Mercs et al. ................ 352/133 |
| 6,424,714 B1 | * | 7/2002 | Wasilewski et al. ........ 380/200 |
| 6,452,952 B1 | * | 9/2002 | Okuhara ..................... 370/536 |

FOREIGN PATENT DOCUMENTS

WO    WO9959335    11/1999

OTHER PUBLICATIONS

Audio/video compression applications using wavelets☐☐Yu–Shen Cheng; Gen–Dow Huang;☐☐Neural Networks, 2002. IJCNN '02. Proceedings of the 2002 International Joint Conference on , vol.: 3, May 12–17, 2002 ☐☐pp.: 2214–2218.*
MPEG–2: where did it come from and what is it?☐☐Morris, O.J.;☐☐MPEG–2—What it is and What it isn't, IEE Colloquium on, Jan. 24, 1995 ☐☐pp.: 1/1–1/5.*
Satellite audio distribution on a video transponder using digital compression and band–edge SCPC technologies Guffee, C.O., Jr.; Winreich, D.; Digital Satellite Communications, 1995. Tenth International Conference on, May 15–19, 1995.*

* cited by examiner

*Primary Examiner*—David Jung
(74) *Attorney, Agent, or Firm*—Philip R. Wadsworth; Sandip S. Minhas; Abdollah Katbab

(57) ABSTRACT

An apparatus and method for the encoding and storage of signals representing at least image information onto a storage medium is claimed. A source generator is configured to convert the signals into digitized image information. A compressor is configured to receive the digitized image information from the source generator and compress the digitized image. An encryptor is configured to receive the compressed digitized image information from the compressor and encrypt the compressed digitized image information. A storage device is configured to then store the encrypted compressed digitized image information onto the storage medium.

90 Claims, 12 Drawing Sheets

APPARATUS AND METHOD FOR ENCODING AND STORAGE OF DIGITAL IMAGE AND AUDIO SIGNALS

CROSS-REFERENCE TO RELATED APPLICATIONS

This application is related to a commonly-owned application, filed concurrently herewith, entitled "Apparatus and Method for Decoding of Digital Image and Audio Signals" having application Ser. No. 09/563,880, which is incorporated herein by reference This application claims priority to U.S. Provisional Patent Application No. 60/168,605 entitled "Apparatus and Method for Distribution and Viewing of High Quality Image and Audio Programs to Remote Locations", filed on Dec. 2, 1999, assigned to the same assignee as the present invention and incorporated herein.

BACKGROUND OF THE INVENTION

I. Field of the Invention

The present invention relates to encoding digital and audio images. More specifically, the present invention relates to an apparatus and a method for encoding digital image and audio information in a digital cinema system. The invention further relates to the coding, compression, encryption, storage, decompression, decryption, and controlled playback of electronic audio/visual programming from a central facility to multiple display projectors or presentation systems.

II. Description of the Related Art

For several decades, the motion picture industry has depended on the duplication, distribution, and projection of celluloid film for delivering creative programming material to geographically diverse theaters around the country and the world. To a large extent, the methods and mechanisms for the distribution of film material has remained relatively unchanged.

The current film duplication and distribution process is illustrated in FIG. 1. Film duplication typically starts with an exceptional quality camera negative. At a film studio 50, a film editor 52 produces a master film copy after the process for producing the original film has taken place. From this master film copy, a film duplication element 54 produces what is referred as a distribution negative, from which distribution prints (known as "positives") are produced in quantities. Depending on the size of the release or number of copies desired for distributing the film, there may be more intermediate steps or multiple copies produced at each stage. The film positives are distributed by courier and other physical means to various theaters, as exemplified by a theater 56. At the theater 56, the movie is displayed by projecting images from the film onto a display surface using a film projector 58. In this traditional system, a multiple track audio program is generally created by an audio editing system 51 and printed along with the motion picture images on the film so that this soundtrack can be played back on a theater sound system 57 in time synchronization with the motion picture in a theater projection system.

Although the distribution process shown in FIG. 1 works well, there are inherent limitations. Due to the use of celluloid material for the film and the bandwidth limitations of the film media, there are restrictions on the ability to provide high fidelity multi-channel audio programming. Then, there is the high expense of making a large number of film duplicates, which can cost several hundreds of dollars for each feature length film. There is also the expense, complexity, and delay associated with physically distributing large canisters of celluloid film to a large and growing number of theater locations. Also, a growing trend in the motion picture theater industry is the development of so called "multiplex" theater locations in which multiple projection auditoriums are located or clustered together at a single theater location. Each projection auditorium may show a motion picture at the same time as other motion pictures are being shown in the other projection auditoriums in the multiplex complex.

Because of the large number of duplicates made, it becomes increasingly difficult to prevent illegal duplication and theft of the material. It is estimated that revenues lost due to piracy and theft account for billions of dollars lost each year by the motion picture industry. Further, duplicated film material tends to degrade over time due to dust collection, wear-and-tear, thermal variances, and other known factors. Finally, management cost and other expenses are involved in the eventual destruction of the film material, which may contain regulated hazardous material.

New and emerging technologies are making it possible to provide alternative approaches to the ongoing film distribution problems. For example, satellite transmission methods are now available, although they are not currently commercially viable for the distribution of high quality audio/visual (AV) material. Since the distribution of film programming is essentially a special type of broadcast to a continent-wide region, a satellite distribution method with inherent advantages to such wide area broadcasting would seem ultimately appropriate for film distribution. However, in order to transmit a high quality AV signal in "real-time," the data rate requirement (in bits per second) is on the order of 1.5 billion bits per second. This high data rate requires the capacity equivalent of an entire satellite to transmit even a single program, which is prohibitively expensive. Moreover, alternative distribution technologies have not been able to offer the image quality and projection brightness available using celluloid film. Competing technologies typically involve audio/visual (AV) signals recorded on various magnetic or optical media for display on video monitors, television, or projection equipment. These technologies do not offer the quality of film due to bandwidth limitations.

In addition to the ability to transmit the necessary information via satellite, the received information must be displayed using a high quality projector, which has not previously been available. Moreover, implementation of a satellite based transmission and receiver system is costly and a radical change from current methods of film distribution and display. It is perceived that such a radical change may not be initially commercially acceptable.

Also, advances in digital technology have led to a revolutionary distribution concept whereby programming material is to electronically stored in a digitized format, rather than on an optical film media. The digitized images may be distributed on various magnetic media or compact optical discs, or transmitted over wired, fiber optic, wireless, or satellite communication systems. A variety of DVD ROM storage formats exist having storage capacities ranging from about 4.5 gigabytes (GB) to about 18 GB. The DVD-ROM storage formats that have a storage capacity greater than about 9 GB are implemented on dual-sided disks. As such, high storage capacity DVD-ROM disks must be manually turned over to access the stored information from the second side of the disk.

An average two hour movie having an average image compressed bit rate of about 40 Mbps for the image track and about eight Mbps for audio and control information requires approximately 45 GB of storage space. Thus, even if a high storage capacity DVD-ROM disk is implemented, a two-hour movie requires use of multiple DVD-ROM disks for adequate capacity.

Further, for playback, the average two-hour DVD-ROM movie requires information to be output at about 6 megabytes per second, or about 48 Mbps. Although some DVD-ROM devices exist advertise an 8 MB/sec transfer rate, the quality and reliability of such devices is unknown. Thus, there is no guarantee that such DVD-ROM devices can reliably sustain a 6 MB/sec transfer rate.

In order to reduce the data rate requirement for the storage of high quality electronic images, compression algorithms are being developed. One digital dynamic image compression technique capable of offering significant compression while preserving the quality of image signals utilizes adaptively sized blocks and sub-blocks of encoded discrete cosine transform (DCT) coefficient data. This technique will hereinafter be referred to as the adaptive block size discrete cosine transform (ABSDCT) method. The adaptive block sizes are chosen to exploit redundancy that exists for information within a frame of image data. The technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Discrete Quadtree Transform technique is discussed in U.S. Pat. No. 5,452,104, entitled "Adaptive Block Size Image Compression Method And System," also assigned to the assignee of the present invention and incorporated by reference herein. The systems disclosed in these patents utilize intraframe encoding, wherein each frame of an image sequence is encoded without regard to the content of any other frame.

Distribution of film information using a digital electronic format actually increases the potential for rapid, low-cost duplication without quality degradation. However, along with the "ease of duplication" associated with digital technology, there exists encryption techniques to ensure that the information is encoded in a way that prevents useful information from being distributed to unauthorized parties.

Technologies such as the ABSDCT compression technique, advanced projection equipment, and electronic encryption methods offer the possibility of a "digital cinema" system. Generally defined, digital cinema refers to the electronic distribution and display of high quality film programming which has been converted to a digital electronic representation for storage, transmission, and display purposes. A digital cinema system would overcome many of the limitations of the current film distribution process. A digital system would not be subject to the quality degradation over time experienced by celluloid film. Further, a digital system virtually eliminates the theft and illegal duplication of celluloid film, and further offers the possibility of implementing security measures within the digital system itself. However, a complete digital cinema system has not been developed by the motion picture industry or related arts.

Several issues and problems remain to be solved. New digital cinema systems require improved forms of protection to prevent theft from theaters. Theater complexes with multiple auditoriums have grown larger in an effort to provide a greater economic return, resulting in more complicated presentation schedules, and a larger number of locations showing a given film. This could require many additional electronic copies to be forwarded to theaters for presentation using current techniques, with associated complexity and operating costs.

Distribution channels and mechanisms are still defined by the older celluloid film copying and distribution techniques discussed above. New techniques are needed to take full advantage of proposed digital cinema processing, to reduce copying, provide faster releases to market, and updating products in release, while providing increased scheduling and distribution flexibility at reasonable cost. At the same time, some film producers, studios, and theater managers would like to have increased centralized control over releases and distribution, and to be able to expand into newer markets. For example, it is desirable to be able to supply films and other audio-visual presentations with alternative sound tracks to address increasing markets for multi-lingual or alternative language audiences, in a more cost effective manner.

What is needed is the integration of certain technology into an apparatus and method for the encoding, encryption, storage, and management of digital image and audio programming. These goals are achieved by the present invention in the manner described below.

SUMMARY OF THE INVENTION

The present invention is an apparatus and method for the encoding and storage of signals representing at least image information onto a storage medium, the apparatus comprising: a source generator configured to convert the encoded signals into digitized image information; a compressor configured to receive the digitized image information from the source generator and to compress the digitized image information, the compressor using an adaptive block sized discrete cosine transform compression technique; an encryptor configured to receive the compressed digitized image information from the compressor and to encrypt the compressed digitized image information; and a storage device configured to receive the encrypted compressed digitized image information from the compressor and store the encrypted compressed digitized image information onto the storage medium. The method of the invention is a method for encoding and storing signals representing at least image information onto a storage medium, the method comprising the steps of: converting the signals into digitized image information; compressing the digitized image information using an adaptive block sized discrete cosine transform compression technique; encrypting the compressed digitized image information; and storing the encrypted compressed digitized image information onto the storage medium.

Accordingly, the apparatus and method provide for the encoding and encryption of image and audio information, generally in the form of programming material. At a central facility or hub, the programming material is digitally compressed, encrypted and stored to be ready for distribution of that material to large screen displays of the program at one or more auditoriums or theater locations. The programming material generally comprises motion picture images, time synchronized audio programming, and/or other related information, such as visual cue tracks for sight-impaired audiences, subtitling for foreign language and/or hearing impaired audiences, advertisements or multimedia time cue tracks. The program material may be lengthy in duration (such as a feature length motion picture), of a shorter duration (such as a motion picture trailer or commercial advertisement) or a still image (such as for an advertisement or announcement). The audio and other related programs need not be time synchronized or stored with the image information, such as the case with background audio programming and advertisements.

At the central hub, the program information is processed for distribution. A source generator, located either at the central hub or an alternative site, may be utilized to generate electronic audio and image signals from an analog or digital input. The source generator may comprise a telecine for generating the electronic image signal and an audio reader for generating the electronic audio signal. Alternatively, the electronic signal may be provided directly from an electronic camera or other electronic source, such as a computer-based image generation system.

The electronic image and audio signals then undergo processing by a compressor/encryptor. Again, the compressor/encryptor may be located either at the central hub or at the same facility as the source generator, for example, a production studio. A known dynamic compression technology may be used to store the image and audio information onto a storage medium. A compression technique such as the ABSDCT method described in U.S. Pat. Nos. 5,452,104, 5,107,345, and 5,021,891 may be used. The storage medium may be any type of high capacity electronic tape, magnetic, or optical storage device, such as CDs, DVDs or hard drives, or network attached storage. Further, some information may instead be transmitted over wired, fiber optic, wireless, or satellite communication systems. The audio signal may be compressed using the above methods or a standard digital audio compression algorithm and stored on similar devices.

The encryption technique involves the use of time-varying electronic key values and/or digital control word sequence, which is provided to authorized receivers or projectors. In addition, a digital signature or "watermark" may be added to the image and/or audio signal. The watermark is not perceptible to the normal viewing audience, but may be used to identify a source of an unauthorized copy of a program when analyzed under non-real-time or still frame playback. Decryption information necessary to decrypt the image and/or audio information is generated at individual decrypter units using secret auditorium specific keys and secure information sent to the theater. Generally, the image and audio signals are separately encrypted. By treating the image and audio portions as separate programs, different audio programs may be combined with image programs for various reasons, such as varying languages.

The compressed and encrypted signals are also stored on a storage medium, or provided transmitted from the central hub. If transmitted, the modulation/transmission technique may add forward error correction information and modulate the data stream for transmission. The transmission may be over any type of wired or wireless communication, such as terrestrial cable, optic, satellite, the Internet or other methods.

The central hub further comprises a network manager. The network manager may include control processors to manage total operation in both the encoder and the theater subsystem, including control of the storage, playback/display, security, and overall monitor/control and network management functions. The network manager is capable of operating under centrally or distributed fully automatic control, semi-automatic control or with manual intervention.

Under control of the network manager, the programming material and additional control information are stored and transferred to the theater subsystems. The network manager also includes control methods for notifying the theater subsystems of the identity of transmitted programs. In addition, a control method is provided to control each theater subsystem's selective storage of the received programming.

At the theater subsystem, a storage device receives the storage medium(s) from the hub. A playback module reads the information from the storage medium, monitors the stored information for errors and requests retransmission of any portions of information that contain errors. A theater manager utilizes a communication path (from the theater system to the central hub) to request retransmission. The communication path may use the telephone network, a satellite channel, the Internet or any type of communication method.

Under the control of the theater manager, the storage device in the theater subsystem may provide for local centralized storage of the programming material. The storage device may contain storage mediums such as DVD disks, removable hard drives, or a (JBOD) Just a Bunch of Drives module. The storage device may store several programs at one time. The storage device may be connected via a local area network (LAN) (electronic or optical) in such a way that any program may be played back and presented on any authorized projector. Also, the same program may be simultaneously played back on two or more projectors. Programming material is routed from the storage device to the designated auditorium(s) via a local area network (LAN) which may use various LAN architectures. For purposes of this description, this description assumes the use of a LAN that incorporates a central network switch architecture. However, other types of LAN architectures are possible with this subsystem.

After the programming material is sequenced by the playback module, a decoder decompresses and decrypts, or descrambles, the programming material. The decompression and decryption algorithms depend on the compression and encryption techniques employed at the central hub. The decompressed/decrypted information is displayed via a projector in the auditorium, while the audio signal is presented via an electronic sound subsystem.

The theater manager generally controls all aspects of projection operations, including storage of the received programming, decompression and decryption of the programming signals, and display of the programming material. The theater manager may also control the period of time and/or the number of play backs that are allowed for each program. Alternatively, control of the presentation process may be located locally at the projector, a remote control unit, or under control of the central hub or other centralized element. In addition, the theater manager may be configured to integrate projection operations with other theater operations, such as concessions, ticketing, promotions, signage, environmental controls, lighting, sound system operation, etc. Also, each theater subsystem may include multiple auditorium modules sharing common storage and control functions for flexible and cost efficient presentation options.

The use of digital encryption provides a built-in security measure. Cryptographic techniques are employed to provided end-to-end encrypted data transfer. That is, the image and/or audio information is encrypted at the source generator and is decrypted at the theater subsystem during playback. In addition to the electronic security measures, physical security measures may provide additional protection of the programming material.

Physical security measures may be especially important for protecting the decompressed/decrypted signals from a "wiretap" prior to display by the projector in the theater subsystem. In an embodiment, the decryption/decompression function is housed in a secure, self-contained chassis which is physically attached to or embedded inside the projector in a manner in which it is generally not removable without authorization access and which physically prevents probing of the decrypted signals. In addition, intrusion into the secured environment or chassis may cause a process to be commenced that deletes or erases cryptographic key information and otherwise deletes or changes any digital data available at the project feed point to prevent copying.

Accordingly, an apparatus and method is provided for the compression, encryption and storage of digital and audio information, as well as management functions to monitor and control such an apparatus.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention comprises an apparatus and method, sometimes referred to herein as "digital cinema", for the electronic generation, compression, encryption, and storage of audio/visual programming, such as motion pictures in theater systems, theaters, theater complexes, and/or presentation systems.

Digital cinema incorporates innovation in image and audio compression, projection technology, encryption methodology, and many other areas. Digital cinema is designed to replace the current method of physical distribution of celluloid film to each play back or projection location such as theaters or remote auditoriums. Digital cinema eliminates the need for duplication of celluloid film, and offers the potential for exceptional audio/visual quality as well as built-in security measures. Programs may be transmitted to theaters and stored on storage devices, such as removable hard drives (RHD) or digital versatile disks (DVD), for display at later times.

While the invention is equally applicable to presentation of image and audio information to a variety of presentation locations such as outdoor amphitheaters, drive-in complexes, civic auditoriums, schools, specialty restaurants, and so forth, an exemplary theater or theater complex is used for purposes of clarity in the discussion below. Those skilled in the art will readily understand how the present invention is applied to other types of locations.

Figure 2:
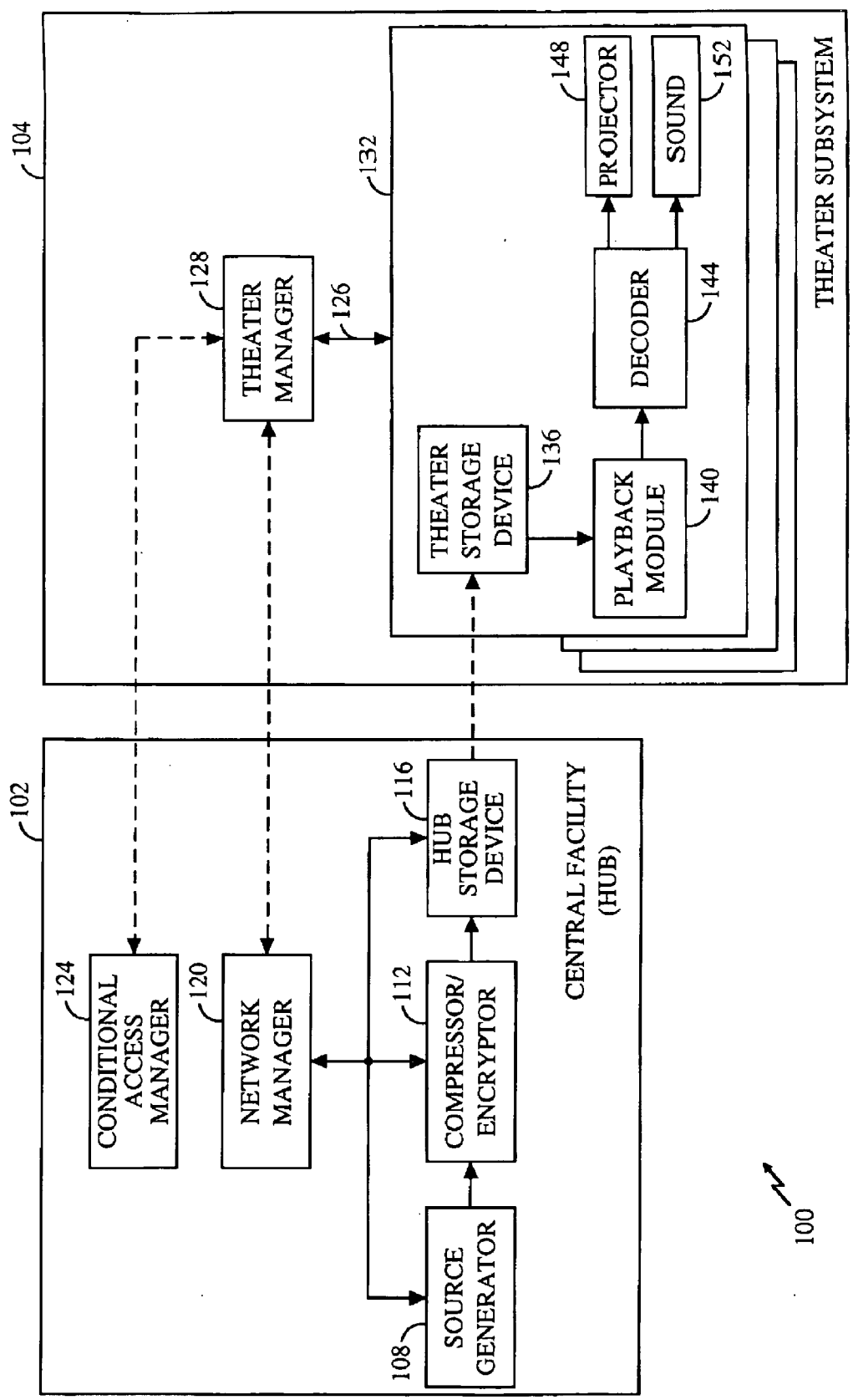
FIG. 2 is a high-level block diagram of an embodiment of the digital cinema system of the present invention.

A digital cinema system 100 of the invention is illustrated in FIG. 2. The digital cinema system 100 comprises two main systems: at least one central facility or hub 102 and at least one presentation or theater subsystem 104. The hub 102 and the theater subsystem 104 are of a similar design to that of pending U.S. patent application Ser. No. 09/075,152 filed on May 8, 1998, assigned to the same assignee as the present invention, and is incorporated by reference herein.

In an embodiment, image and audio information are compressed and stored on a storage medium, and distributed from the hub 102 to the theater subsystem 104. Generally, one theater subsystem 104 is utilized for each theater or presentation location in a network of presentation locations that is to receive image or audio information, and includes some centralized equipment as well as certain equipment employed for each presentation auditorium.

In the central hub 102, a source generator 108 receives film material and generates a digital version of the film. The digital information is compressed and encrypted by a compressor/encryptor (CE) 112, and stored on a storage medium by a hub storage device 116. A network manager 120 monitors and sends control information to the source generator 108, the CE 112, and the hub storage device 116. A conditional access manager 124 provides specific electronic keying information such that only specific theaters are authorized to show specific programs.

In the theater subsystem 104, a theater manager 128 controls a theater manager 132. Based on control information received from the theater manager 132, a theater storage device 136 transfers compressed information stored on the storage medium to a playback module 140. The playback module 140 receives the compressed information from the theater storage device 136, and prepares the compressed information to a predetermined sequence, size and data rate. The playback module 140 outputs the compressed information to a decoder 144. The decoder 144 inputs compressed information from the playback module 140 and performs decryption, decompression and formatting, and outputs the information to an projector 148 and a sound module 152. The projector 148 plays the information on a projector and the sound module 152 plays sound information on a sound system, both under control of the theater manager 132.

In operation, the source generator 108 provides digitized electronic image and/or programs to the system. Typically, the source generator 108 receives film material and generates a magnetic tape containing digitized information or data. The film is digitally scanned at a very high resolution to create the digitized version of the motion picture or other program. Typically, a "telecine" process generates the image information while well-known digital audio conversion processing generates the audio portion of the program. The images being processed need not be provided from a film, but can be single picture or still frame type images, or a series of frames or pictures, including those shown as motion pictures of varying length. These images can be presented as a series or set to create what are referred to as image programs. In addition, other material can be provided such as visual cue tracks for sight-impaired audiences, subtitling for foreign language and/or hearing impaired audiences, or multimedia time cue tracks. Similarly, single or sets of sounds or recordings are used to form desired audio programs.

Alternatively, a high definition digital camera or other known digital image generation device or method may provide the digitized image information. The use of a digital camera, which directly produces the digitized image information, is especially useful for live event capture for substantially immediate or contemporaneous distribution. Computer workstations or similar equipment can also be used to directly generate graphical images which are to be distributed.

The digital image information or program is presented to the compressor/encryptor 112, which compresses the digital signal using a preselected known format or process, reducing the amount of digital information necessary to reproduce the original image with very high quality. In a preferred embodiment, a ABSDCT technique is used to compress the image source. The ABSDCT compression technique is disclosed in U.S. Pat. Nos. 5,021,891, 5,107,345, and 5,452,104 mentioned above. The audio information may also be digitally compressed using standard techniques and may be time synchronized with the compressed image information. The compressed image and audio information is then encrypted and/or scrambled using one or more secure electronic methods.

The network manager 120 monitors the status of compressor/encryptor 112, and directs the compressed information from the compressor/encryptor 112 to the hub storage device 116. The hub storage device 116 is comprised of one or more storage mediums (shown in FIG. 8). The storage medium(s) may be any type of high capacity data storage device, such as a digital versatile disk (DVD) or a removable hard drive (RHD) and as described further herein. Upon storage of the compressed information onto the storage medium, the storage medium is physically transported to the theater subsystem 104, and in particular, to the theater storage device 136.

In alternative embodiments, the compressed image and audio information are each stored in a non-contiguous or separate manner independent of each other. That is, a means is provided for compressing and storing audio programs associated with image information or programs but segregated in time. There is no requirement when using the present invention to process the audio images at the same time. A predefined identifier or identification mechanism or scheme is used to associate corresponding audio and image programs with each other, as appropriate. This allows linking of one or more preselected audio programs with at least one preselected image program, as desired, at a time of presentation, or during a presentation event. That is, while not initially time synchronized with the compressed image information, the compressed audio is linked and synchronized at presentation of the program.

Further, maintaining the audio program separate from the image program allows for synchronizing multiple languages from audio programs to the image program, without having to recreate the image program for each language. Moreover, maintaining a separate audio program allows for support of multiple speaker configurations without requiring interleaving of multiple audio tracks with the image program.

In addition to the image program and the audio program, a separate promotional program, or promo program, may be added to the system. Typically, promotional material changes at a greater frequency than the feature program. Use of a separate promo program allows promotional material to be updated without requiring new feature image programs. The promo program comprises information such as advertising (slides, audio, motion or the like) and trailers shown in the theater. Because of the high storage capacity of storage mediums such as DVD or RHD, thousands of slides or pieces of advertising may be stored. The high storage volume allows for customization, as specific slides, advertisements or trailers may be shown at specific theaters at targeted customers.

Although FIG. 2 illustrates the compressed information in the storage device 116 and physically transporting storage medium(s) to the theater subsystem 104, it should be understood that the compressed information, or portions thereof, may be transmitted to the theater storage device 136 using any of a number wireless or wired transmission methods. Transmission methods include satellite transmission, well-known multi-drop, Internet access nodes, dedicated telephone lines, or point-to-point fiber optic networks.

Figure 1:
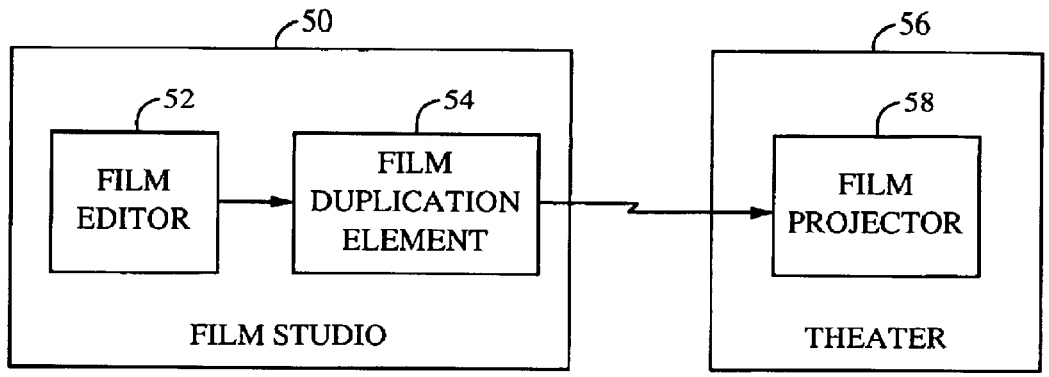
FIG. 1 is a block diagram of a traditional film distribution system.
Figure 3:
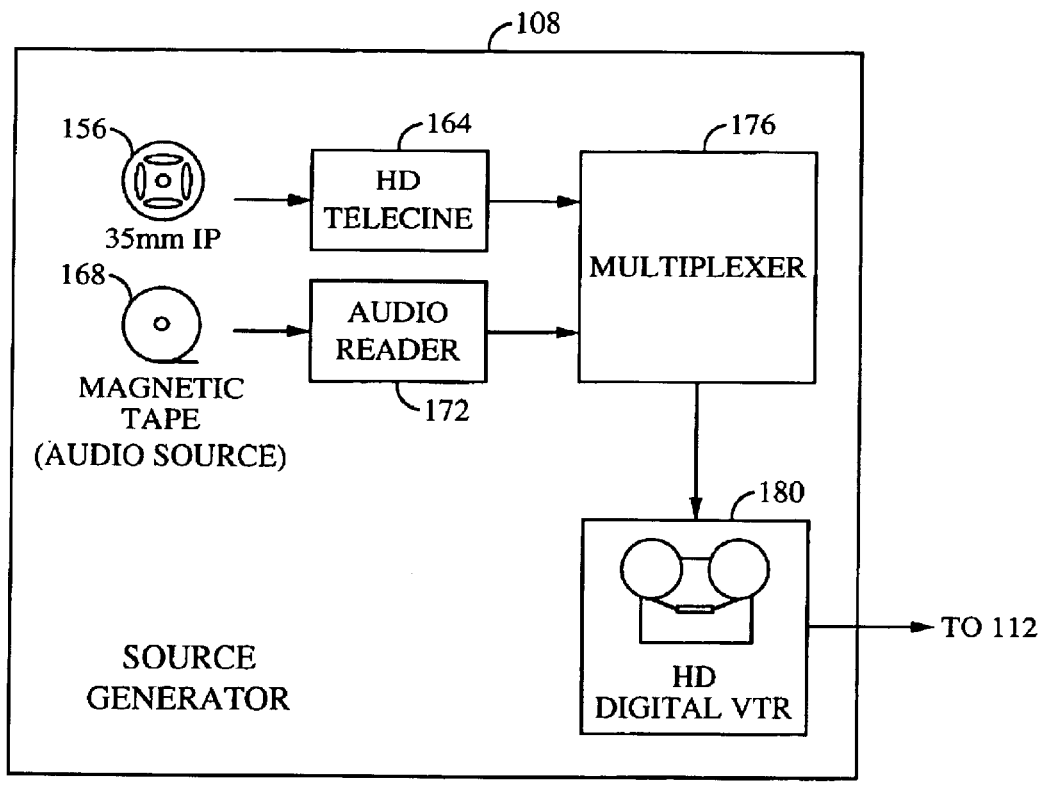
FIG. 3 is a block diagram of a film-based source generator.

Embodiments of the processing blocks of the central hub 102 are illustrated in FIGS. 2–9 and described herein. The source generator 108 is illustrated in FIG. 3. In FIG. 3, the source generator 108 digitizes a film image source 156 such as a 35 mm motion picture film, and stores the digitized version on a magnetic tape. The source generator 108 comprises a high definition (HD) "telecine" apparatus or process 164 for receiving the film source 156 and for generating digitized images from the film source 156. The telecine processing is well known within the motion picture industry, and any one of several commercially available services or devices may be used to implement this process. However, in a preferred embodiment, high resolution telecine processing is used such as is currently available with equipment produced by CINTEL or Philips BTS, as is known in the art. The resolution and specific choices of equipment used are determined according to cost and other well known factors when a service is being designed. Alternative resolutions can also be used depending on the target audience, projection equipment available, and location, including a desire to reduce data rates for certain satellite transfers.

If the original film 156 is a standard format 35 mm source, the process is performed on the image using a telecine process at 24 frames per second. The digitized output of the telecine process may be stored using a high data rate magnetic tape recorder or immediately compressed and/or encrypted and stored using a lower data rate tape recorder, or other known image storage system and media.

Since the telecine only processes the image, the audio portion of the input source is processed independently of the image. If the audio source is in analog format, it is typically provided on a magnetic tape 168 to an audio reader 172 for digitizing. In one embodiment, up to twelve channels of digitized audio are combined with the digitized image by a multiplexer 176. The multiplexed signal is stored with the image program on a storage medium such as a high density digital video tape recorder 180 or a similar high capacity digital storage system. Alternatively, as mentioned above, the audio programming may be stored and processed separately from the image programming, but with time synchronization information included to allow for properly time aligned combination with the image program at the projection auditorium playback system. The time synchronization information may be stored on the image program, the audio program or on a separate control program.

Although shown as part of the central hub 102, it should be understood that the source generator 108 may be located in a facility other than the central hub 102. Other facilities may be just as suitable for generating the digitized signal from a magnetic or an optical source. Alternatively, the source generator 108 may consist of a digital camera with a magnetic or optical storage device built in or other digital means of image generation (such as for computer generated graphics or special effects) which directly produces digital source material. The source generator 108 may also consist of a digitization system for still images, such as an optical scanner or an image converter used for 35 mm photographic slides or prints. Therefore, regular or specialized studios such as for special effects, or other facilities participating in the preparation and presentation of an image program can generate the desired digitized material which is then transferred to the hub 102 for further processing or transmission.

Figure 4:
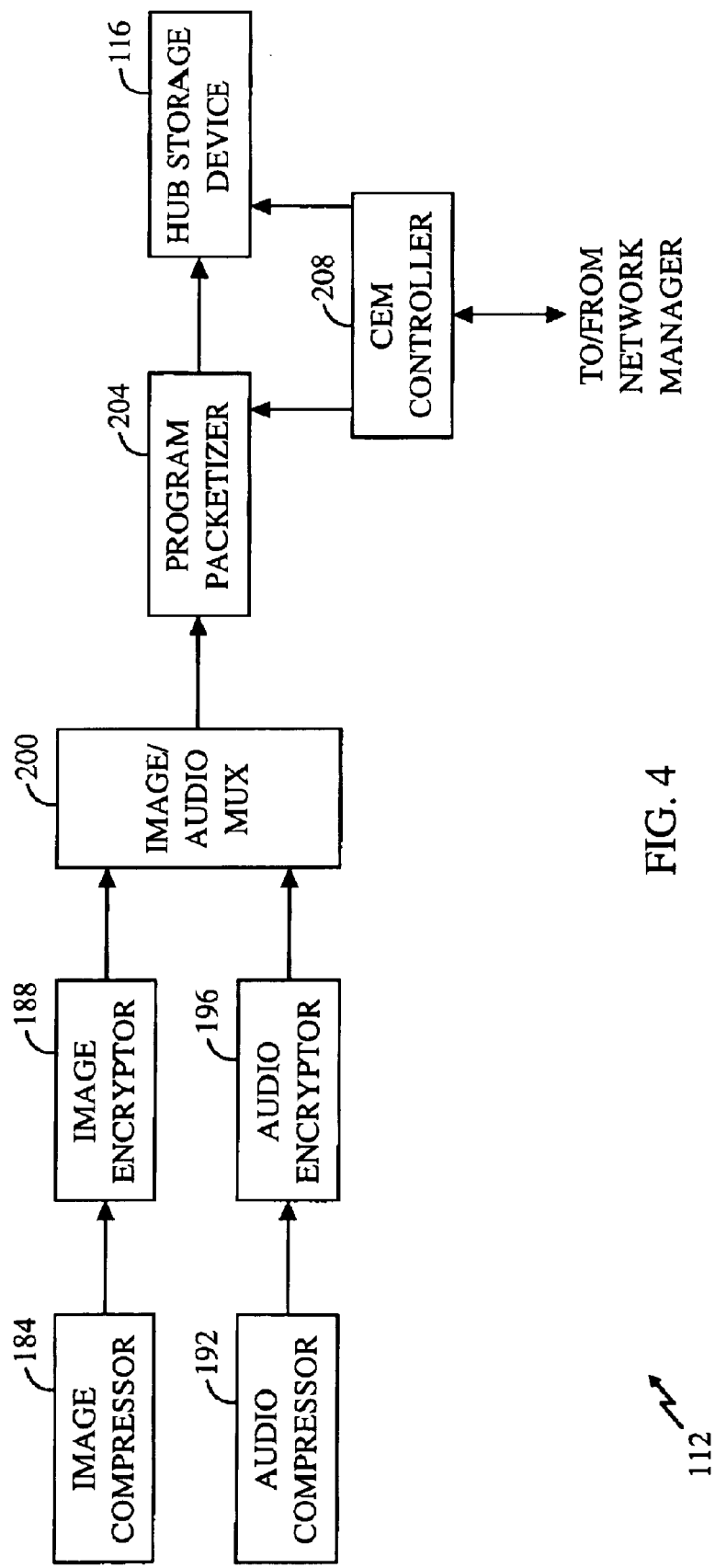
FIG. 4 is a block diagram of a compressor/encryptor.

A block diagram of the compressor/encryptor 112 is illustrated in FIG. 4. Similar to the source generator 108, the compressor/encryptor 112 may be part of the central hub 102 or located in a separate facility. For example, the compressor/encryptor 112 may be located with the source generator 108 in a film or television production studio. In addition, the compression process for either image or audio information or data may be implemented as a variable rate process.

The compressor/encryptor 112 receives a digital provided by the source generator 108. The digital image and audio information may be stored in frame buffers (not shown) before further processing.

The digital image signal is passed to an image compressor 184. In a preferred embodiment, the image compressor 184 processes a digital image signal using the ABSDCT technique described in U.S. Pat. Nos. 5,021,891, 5,107,345, and 5,452,104 mentioned above.

In the ABSDCT technique, the color input signal is generally in a YIQ format, with Y being the luminance, or brightness, component, and I and Q being the chrominance, or color, components. Other formats such as the YUV or RGB formats may also be used. Because of the low spatial sensitivity of the eye to color, the ABSDCT technique sub-samples the color (I and Q) components by a factor of two in each of the horizontal and vertical directions. Accordingly, four luminance components and two chrominance components are used to represent each spatial segment of image input.

Each of the luminance and chrominance components is passed to a block interleaver. Generally, a 16×16 block is presented to the block interleaver, which orders the image samples within the 16×16 blocks to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the image source. After the DCT is performed, most of the image signal energy tends to be concentrated in a few DC coefficients.

For the 16×16 block and each sub-block, the transformed coefficients are analyzed to determine the number of bits required to encode the block or sub-block. Then, the block or the combination of sub-blocks which requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order. The DCT coefficient values may then undergo further processing such as, but not limited to, frequency weighting, quantization, and coding (such as variable length coding) using known techniques, in preparation for transmission. The compressed image signal is then provided to at least one image encryptor 188.

The digital audio signal is generally passed to an audio compressor 192. In a preferred embodiment, the audio compressor 192 processes multi-channel audio information using a standard digital audio compression algorithm. The compressed audio signal is provided to at least one audio encryptor 196. Alternatively, the audio information may be transferred and utilized in an uncompressed, but still digital, format.

The image encryptor 192 and the audio encryptor 196 encrypts the compressed image and audio signals, respectively, using any of a number of known encryption techniques. The image and audio signals may be encrypted using the same or different techniques. In a preferred embodiment, an encryption technique, which comprises real-time digital sequence scrambling of both image and audio programming, is used.

At the image and audio encryptors 192 and 196, the programming material is processed by a scrambler/encryptor circuit that uses time-varying electronic keying information (typically changed several times per second). The scrambled program information can then be stored or transmitted, such as over the air in a wireless link, without being decipherable to anyone who does not possess the associated electronic keying information used to scramble the program material or digital data.

Encryption generally involves digital sequence scrambling or direct encryption of the compressed signal. The words "encryption" and "scrambling" are used interchangeably and are understood to mean any means of processing digital data streams of various sources using any of a number of cryptographic techniques to scramble, cover, or directly encrypt said digital streams using sequences generated using secret digital values ("keys") in such a way that it is very difficult to recover the original data sequence without knowledge of the secret key values.

Each image or audio program may use specific electronic keying information which is provided, encrypted by presentation-location or theater-specific electronic keying information, to theaters or presentation locations authorized to show that specific program. The conditional access manager 124, or CAM, handles this function. The encrypted program key needed by the auditorium to decrypt the stored information is transmitted, or otherwise delivered, to the authorized theaters prior to playback of the program. Note that the stored program information may potentially be transmitted days or weeks before the authorized showing period begins, and that the encrypted image or audio program key may be transmitted or delivered just before the authorized playback period begins. The encrypted program key may also be transferred using a low data rate link, or a transportable storage element such as a magnetic or optical media disk, a smart card, or other devices having erasable memory elements. The encrypted program key may also be provided in such a way as to control the period of time for which a specific theater complex or auditorium is authorized to show the program.

Each theater subsystem 104 that receives an encrypted program key decrypts this value using its auditorium specific key, and stores this decrypted program key in a memory device or other secured memory.

When the program is to be played back, the theater or location specific and program specific keying information is used, preferably with a symmetric algorithm, that was used in the encryptor 112 in preparing the encrypted signal to now descramble/decrypt program information in real-time.

Referring back to FIG. 4, in addition to scrambling, the image encryptor 192 may add a "watermark," which is usually digital in nature, to the image programming. This involves the insertion of a location specific and/or time specific visual identifier into the program sequence. That is, the watermark is constructed to indicate the authorized location and time for presentation, for more efficiently tracking the source of illicit copying when necessary. The watermark may be programmed to appear at frequent, but pseudo-random periods in the playback process and would not be visible to the viewing audience. The watermark is perceptually unnoticeable during presentation of decompressed image or audio information at what is predefined as a normal rate of transfer. However, the watermark is detectable when the image or audio information is presented at a rate substantially different from that normal rate, such as at a slower "non-real-time" or still frame playback rate. If an unauthorized copy of a program is recovered, the digital watermark information can be read by authorities, and the theater from which the copy was made can be determined. Such a watermark technique may also be applied or used to identify the audio programs.

The compressed and encrypted image and audio signals are both presented to a multiplexer 200. At the multiplexer 200, the image and audio information is multiplexed together along with time synchronization information to allow the image and audio streamed information to be played back in a time aligned manner at the theater subsystem 104. The multiplexed signal is then processed by a program packetizer 204, which packetizes the data to form the program stream. By packetizing the data, or forming "data blocks," the program stream may be monitored during decompression at the theater subsystem 104 (FIG. 2) for errors in receiving the blocks during decompression. Requests may be made by the theater manager 128 of the theater subsystem 104 to acquire data blocks exhibiting errors. Accordingly, if errors exist, only small portions of the program need to be replaced, instead of an entire program. Requests of small blocks of data may be handled over a wired or wireless link. This provides for increased reliability and efficiency.

In an alternate embodiment of the present invention, the image and audio portions of a program are treated as separate and distinct programs. Thus, instead of using the multiplexer 200 to multiplex the image and audio signals, the image signals are separately packetized. In this embodiment, the image program may be transported exclusive of the audio program, and vice versa. As such, the image and audio programs are assembled into combined programs only at playback time. This allows for different audio programs to be combined with image programs for various reasons, such as varying languages, providing post-release updates or program changes, to fit within local community standards, and so forth. This ability to flexibly assign audio different multi-track programs to image programs is very useful for minimizing costs in altering programs already in distribution, and in addressing the larger multi-cultural markets now available to the film industry.

The compressors 184 and 192, the encryptors 188 and 196, the multiplexer 200, and the program packetizer 204 may be implemented by a compression/encryption module (CEM) controller 208, a software-controlled processor programmed to perform the functions described herein. That is, they can be configured as generalized function hardware including a variety of programmable electronic devices or computers that operate under software or firmware program control. They may alternatively be implemented using some other technology, such as through an ASIC or through one or more circuit card assemblies. That is, constructed as specialized hardware.

The image and audio program stream is sent to the hub storage device 116. The CEM controller 208 is primarily responsible for controlling and monitoring the entire compressor/encryptor 112. The CEM controller 208 may be implemented by programming a general purpose hardware device or computer to perform the required functions, or by using specialized hardware. Network control is provided to CEM controller 208 from the network manager 120 (FIG. 2) over a hub internal network, as described herein. The CEM controller 208 communicates with the compressors 184 and 192, the encryptors 188 and 196, the multiplexer 200, and the packetizer 204 using a known digital interface and controls the operation of these elements. The CEM controller 208 may also control and monitor the storage module 116, and the data transfer between these devices.

The storage device 116 is preferably constructed as one or more RHDs, DVDs disks or other high capacity storage mediums, which in general is of similar design as the theater storage device 116 in theater subsystem 104 (FIG. 2). However, those skilled in the art will recognize that other media may be used in some applications. The storage device 116 receives the compressed and encrypted image, audio, and control data from the program packetizer 204 during the compression phase. Operation of the storage device 116 is managed by the CEM controller 208.

Figure 5:
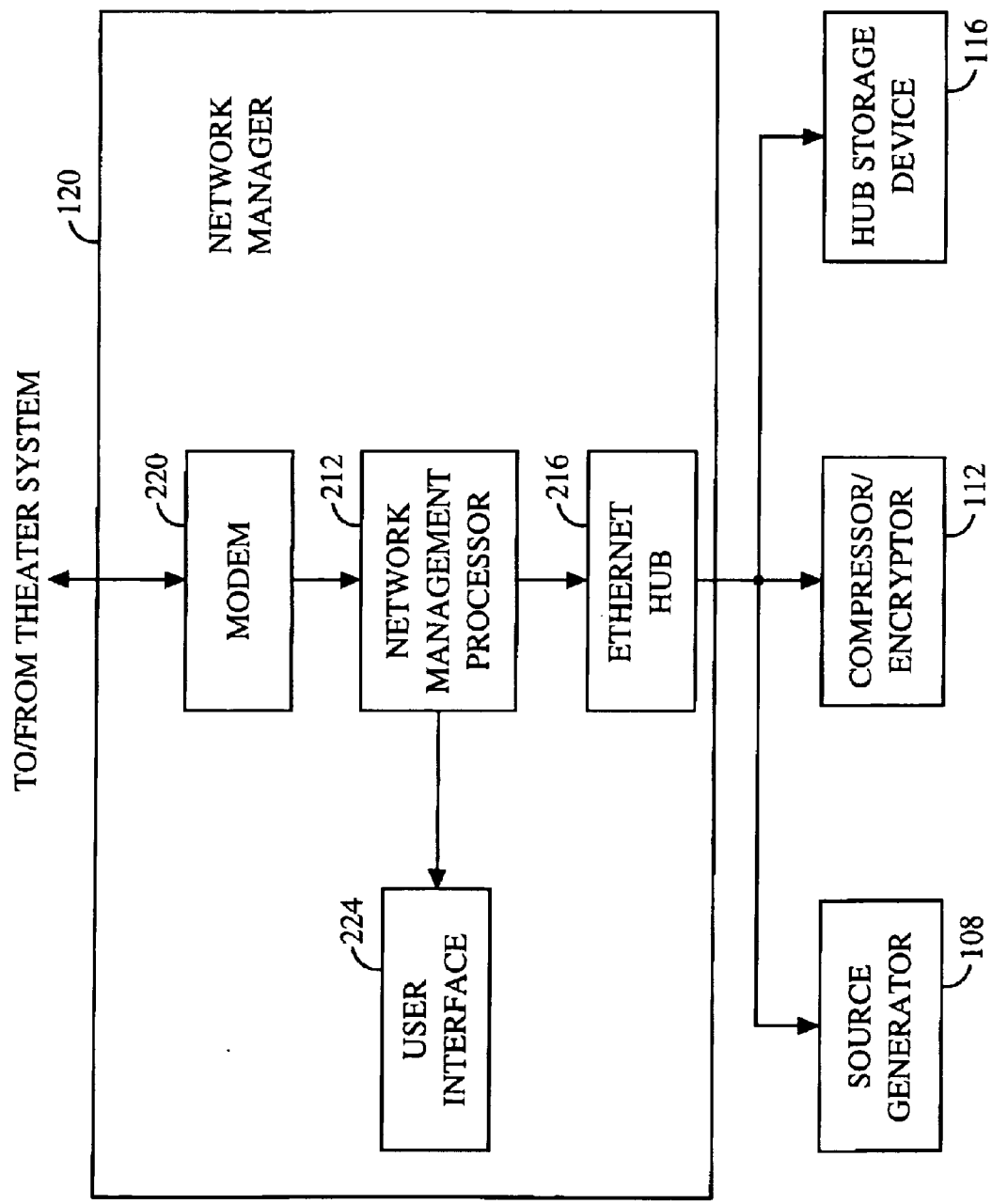
FIG. 5 is a block diagram of a network manager.

Referring now to FIG. 5, a network manager 120 is illustrated. The network manager 120 controls and manages the hub 102, and optionally, the entire digital cinema system 100, including control and monitoring of the components of one or more theater systems 104. The control may be centralized such that the network manager 120 manages the total operation of the system, including control of the transfer, playback/display, security, and overall network management functions. Alternatively, a distributed management system, in which processors in the presentation or theater systems control some of the theater functions, may be implemented.

The network manager 120 comprises at least one network management processor 212, which is the central controller or "brain" for the digital cinema system 100. The network manager 120 is, in general, based on a standard platform workstation, or similar programmable data processing hardware. The network management processor 212 manages the scheduling and security aspects of the hub 102. Under control of the network manager 120, control information or updates to programs may be transmitted from the hub 102 in advance of the time for display of the programming to the theater subsystem 104. The network management processor 212 also controls the transmission or transfer rate of the programs to the theater subsystem 104. The transmission rate may be fixed or varied depending on the type of program and the design of the transfer channel or path. For example, this may depend on the transfer rates for a particular data link. Also, the data rate of the compression coding of the programming material may vary for different programs, offering varying quality levels of compression.

The network management processor 212 interfaces to the other components of the hub over a hub internal network, which is typically implemented using a standard multi-drop network architecture. However, other known network designs and types including optical based links can be used. In a preferred embodiment, an Ethernet hub 216 of the network management system 112 supports the hub internal network, as discussed herein with reference to FIG. 6.

The network manager 120 may also comprise a modem 220, which provides an interface to the network of theaters over the Internet or the PSTN, and generally comprises of a set of dialup telephone modems, cable or satellite modems, ISDN or cellular link controllers, or other known means. Modem 220 interfaces to the network management processor 212 via a modem server function. The modem 220 serves as the receiver of a return link communication path from the theaters to the central hub 102. For example, the theater manager 128, illustrated in FIG. 7, monitors the quality of the decompression process of the theater subsystem 104 and provides a quality report to network management system 120. The return path may be utilized by the theaters to request retransmission of program data blocks with errors from central hub 102. Furthermore, extra presentations of programs, or changes or updates in program material can be requested using this link. In alternative embodiments, the return path may be provided through a satellite channel or another low data rate communication method or via the Internet. In this case, other known means or devices for interfacing are implemented, as appropriate, instead of the modem 220.

A user interface 224 allows a user to have direct control over the network manager 112, and accordingly, the entire hub 102 and/or the theater subsystem 104. The user may monitor the status of the hub 102 and direct the timing of the various modules of the hub 102. Further, the user interface 224 allows for configuration of the various embodiments of the storage device 116, including the type of storage medium to be used, and how and where programs are to be stored on the storage mediums. The user interface 224 is typically a personal computer having a monitor and keyboard interface.

Figure 6:
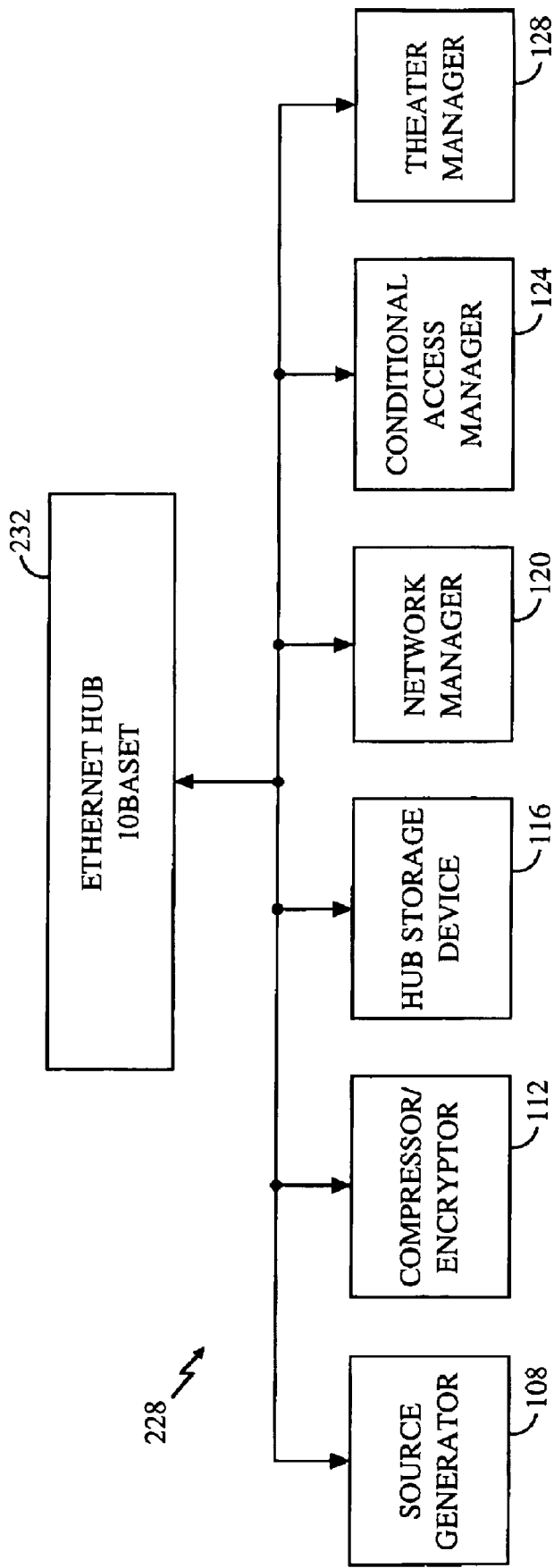
FIG. 6 is a block diagram illustrating a hub internal network and central hub redundancy.

Referring now to FIG. 6, a block diagram of hub internal network 228 is illustrated. Hub internal network 228 is the communication backbone for central hub 102. Hub internal network 228 may be extended internally as an Ethernet Local Area Network (LAN) running an IP protocol suite. Thus, hub internal network 228 physically interconnects the compressor/encryptor 112, the storage device 116, the network manager 120, the conditional access manager 124, and, optionally, the theater manager 128 of the theater subsystem 104 to an ethernet hub 232. Also, the hub internal network 228 may include redundant or backup components to meet availability requirements in the event of primary component failure. As appropriate to the specific functional partitioning of local and remote functions, an external interface may also be provided to connect central hub 102 to an external computer network or communication system, if desired.

As illustrated in FIG. 2, the theater subsystem 104 is constructed with at least one and generally multiple theater manager 132 controlled by the theater manager 128. For example, in some commercial markets theaters are constructed as theater complexes having many auditoriums at a single site, often referred to as cineplex or multiplex theaters. The stored compressed information can be transferred to one or multiple ones of the auditorium modules 132 within a single theater complex.

The auditorium module 132 comprises the theater storage device 136, the playback module 140, the decoder 144, and the projector 148 and the sound module 152. In operation, the theater storage device 136 contains compressed information on the storage medium. Various embodiments of the storage device 136 are illustrated in FIG. 7. Generally, the storage medium is physically transported from the hub 102 to the theater subsystem 104, although it is contemplated that portions of information may be transmitted from the hub 102 to the theater subsystem 104. The storage medium may be one or more DVD disks 236 (FIGS. 7A and 7C), one or more removable hard drives 240 (FIG. 7B), an internal hard drive (IHD) 244 in the playback module (FIG. 7D), a JBOD (Just a Bunch of Drives) module 248 (FIG. 8) comprising many memory elements or any combination thereof.

Figure 7E:
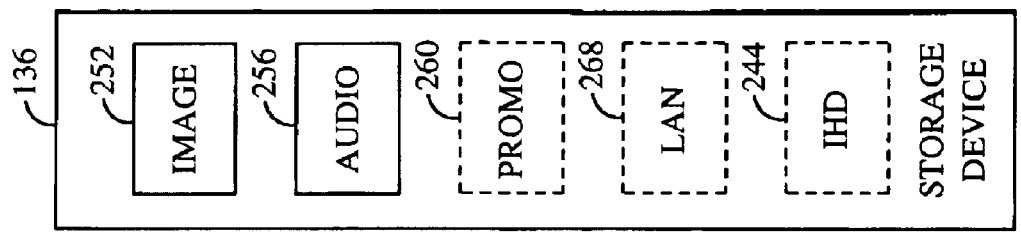
FIGS. 7A–E are block diagrams of a storage device.

In an embodiment using DVDs as the storage medium, multiple DVD disks 236 may be used. This embodiment is illustrated in FIG. 7A. An average two hour movie having an image compressed bit rate of about 40 Mbps for the image track and about eight Mbps for audio and control information requires approximately 45 GB of storage space. Current DVD-ROM storage formats range from about 4.5 GB to about 18 GB. Storage capacities greater than about 9 GB are on dual-sided disks that must be turned over to read the second side of the disk. Thus, even if a high storage capacity DVD-ROM disk is implemented, a two hour movie requires use of multiple DVD-ROM disks for adequate capacity.

As described earlier, it is preferable to separate image information from audio information. This embodiment is illustrated in FIG. 7C. The image program 252 is stored on a separate storage medium than the audio program 256. The storage medium may be DVD disks or RHDs. There is no requirement when using the present invention to process audio programs at the same time. Maintaining the audio program separate from the image program allows for synchronizing multiple languages from audio programs to the image program, without having to recreate the image program for each language. Moreover, maintaining a separate audio program allows for support of multiple speaker configurations without requiring interleaving of multiple audio tracks with the image program.

In addition to the image program 252 and the audio program 256, a separate promotional program 260, or promo program, may be added to the system. Use of a separate promo program 260 allows promotional material to be updated without requiring new feature image programs 252. The promo program 260 may comprise advertising, trailer, control, and/or keying information for the theater subsystem 104.

Use of the removable hard disk as the storage medium offers several advantages, such as ease of duplication and the likelihood of a lower error rate. This embodiment is illustrated in FIG. 7B. Stored information on the hard disk 240 is easily replicated by writing information onto disks in a standard personal computer (PC) environment. Further, because of the large storage capacity of removable hard drives, fewer removable hard drives are necessary. Use of hard drives, in comparison to other storage mediums, lowers the likelihood of handling errors. Also, a removable hard drive is more likely to hold data integrity in case of encountering a harsh environment, such as rough handling during shipping, or exposure to dust, dirt, noise or other foreign matter.

Figure 7D:
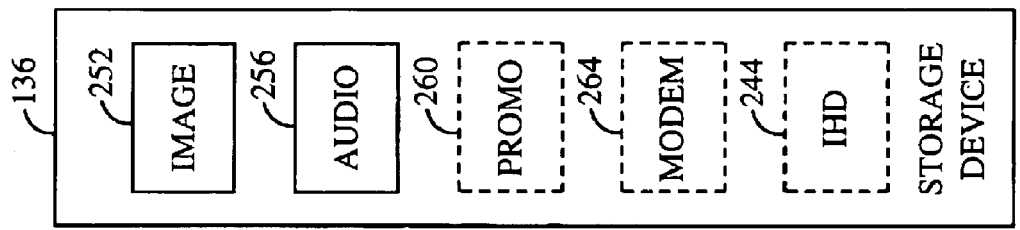
Figure 7C:
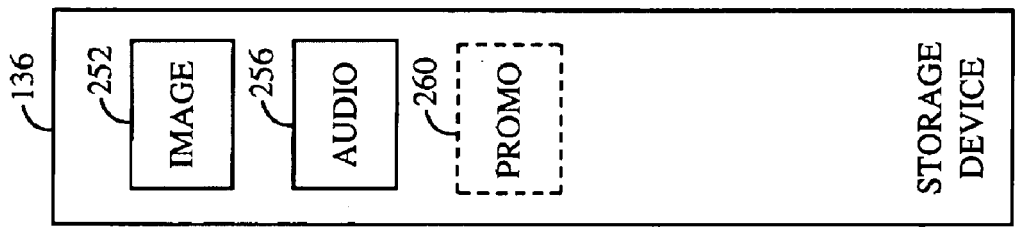
Figure 7B:
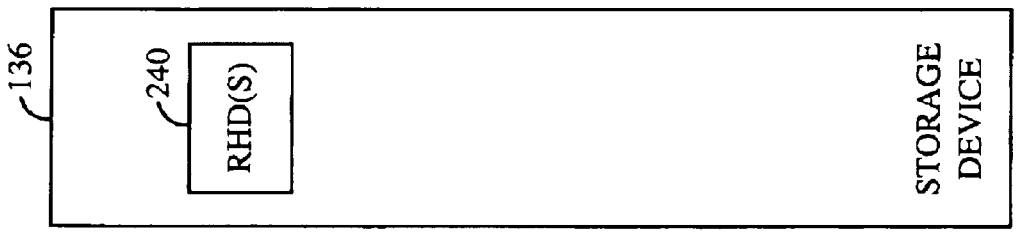
Figure 7A:
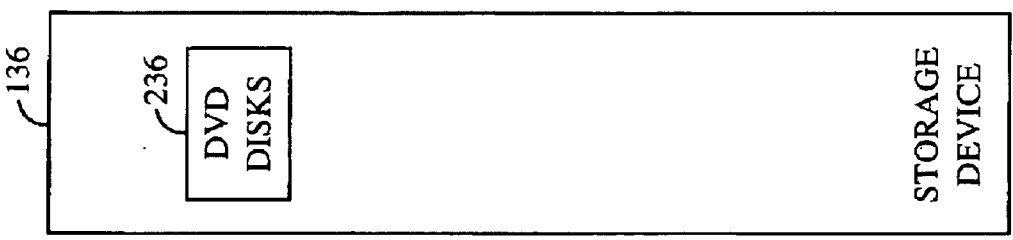

In another embodiment illustrated in FIG. 7D, an internal hard disk (IHD) 244 and modem 264 are utilized in addition to other storage mediums. Storage of information on the IHD 244 via the modem 264 allows for information to be sent directly to the theater over existing communications systems, such as telephone lines, ISDN, cable modem, or DSL links. For example, updates to advertising and trailer information may be sent via phone lines and stored on the IHD 244. Updated slides may optionally be presented in the theater directly from the IHD 244, rather than from the promotional program disk. Sending updates of advertising and trailer information via the modem 264 connection results in significant cost savings, as the cost of pressing and distributing additional promotional program disks is avoided.

Another function of the IHD 244 is that of a data integrity system. The IHD 244 checks information stored on the storage medium for data integrity before being sent to the playback module. The data integrity system checks for an electronic signature for each block of data. If any CRC block fails in the check procedure, or if the data block is missing, the playback module uses the modem connection to request that the blocks of data in error be resent. Upon request, the requested blocks of data are stored on the IHD 244. When the playback module is playing the program, the playback module accesses the IHD 244 to play the requested block(s) of data at the appropriate time. For efficiency and data rate concerns, it is most useful to access a relatively few number of data blocks. If the error checking system discovers that large numbers of blocks of data are corrupted, an error message indicator lets a user determine if the amount of data in question warrants physical distribution of data disks.

Use of the IHD 244 and modem 264 is also beneficial for the distribution of cryptographic keying material. Cryptographic keying material and other control information is sent from the conditional access manager 124 to the IHD 244 by either physically sending the data in a separate storage medium, or using the modem 264. In turn, operational status, history, and other information may be transferred to the conditional access manager 124. Although control information is transmitted from the central hub 102, and although the theater subsystem 104 is capable of receiving all transmitted information, the theater subsystem 104 selectively demodulates and stores only received programming intended for the particular theater module 104.

Given sufficient capacity of the ED 244, or by using the JBOD module 348, image programs, audio programs and/or promo programs may be uploaded from the storage medium to the IHD. Use of the IHD 244 allows the playback module to support double-feature and other multiple program scheduling. Further, a given feature may be shown on multiple screens by uploading the program(s) to multiple playback modules such that the feature is played from the IHD 244 of each playback module.

In an alternate embodiment illustrated in FIG. 7E, a local area network (LAN) interface 268 may replace the modem interface 264 illustrated in FIG. 7D. In addition to accomplishing the functions with respect to the modem interface 264 described above, the LAN interface 268 may connect to one or more playback modules and/or to the theater manager 128. A user interface (not shown) is connected into the LAN interface 268 and/or the theater manager 128 such that the user may remotely control and monitor functions such as scheduling, control, and fault monitoring of each playback module, decoder module, or image and sound modules. Further, it is contemplated that the network manager 120 may be connected into the LAN interface 268. The LAN interface 268 also allows for programs to be transferred between playback modules.

Figure 8:
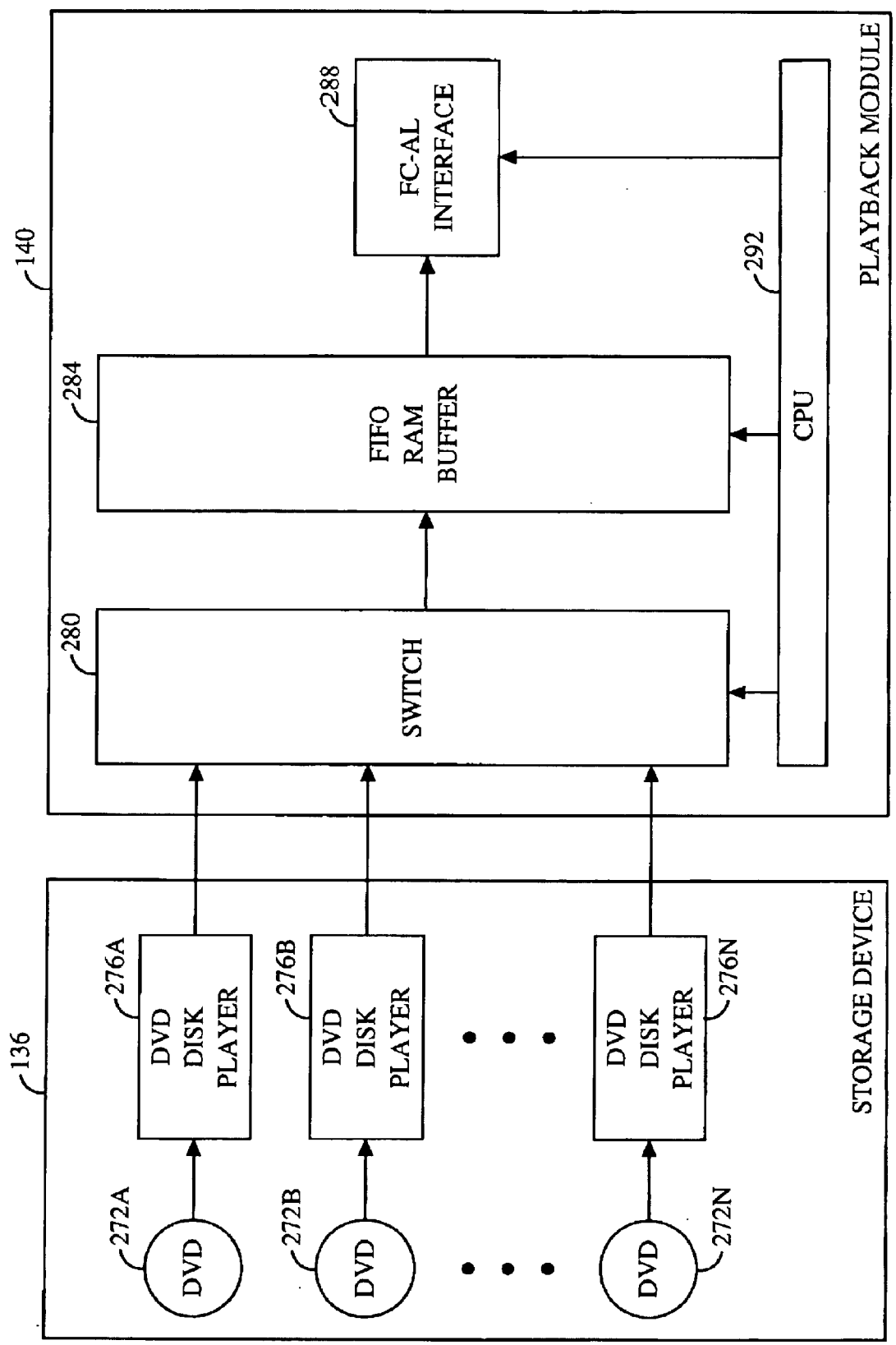
FIG. 8 is a block diagram of a storage device using multiple disk players in serial and a playback player.

An embodiment using multiple DVD disks 272a, 272b, . . . 272n as the storage medium and a set of single-play DVD disk players 276a, 276b, . . . 276n is illustrated in FIG. 8. The set of single-play DVD disk players 276a, 276b, . . . 276n is played in a serial mode, in a predetermined sequence, playing the stored information on its respective disk. The stored information is fed, via a switch 280, into a buffer 284, such as the FIFO RAM buffer 284 illustrated in FIG. 8. The FIFO-RAM buffer 284 is of a sufficient capacity such that the decoder 144, and subsequently the projector 148, is not overloaded or underloaded with portions of information. In a preferred embodiment, the FIFO-RAM buffer 284 has a capacity of about 100 to 200 MB. Use of the FIFO-RAM buffer 284 is especially significant when the DVD disks 272a, 272b, . . . 272n are read in the serial mode. When the DVD disks are read in serial mode, there may be a several second delay when switching from one disk to another.

The stored data is then fed into the decoder 144 through a fiber channel interface 288. The switch 280, buffer 284 and fiber channel interface are controlled by the playback module CPU 292.

Figure 9:
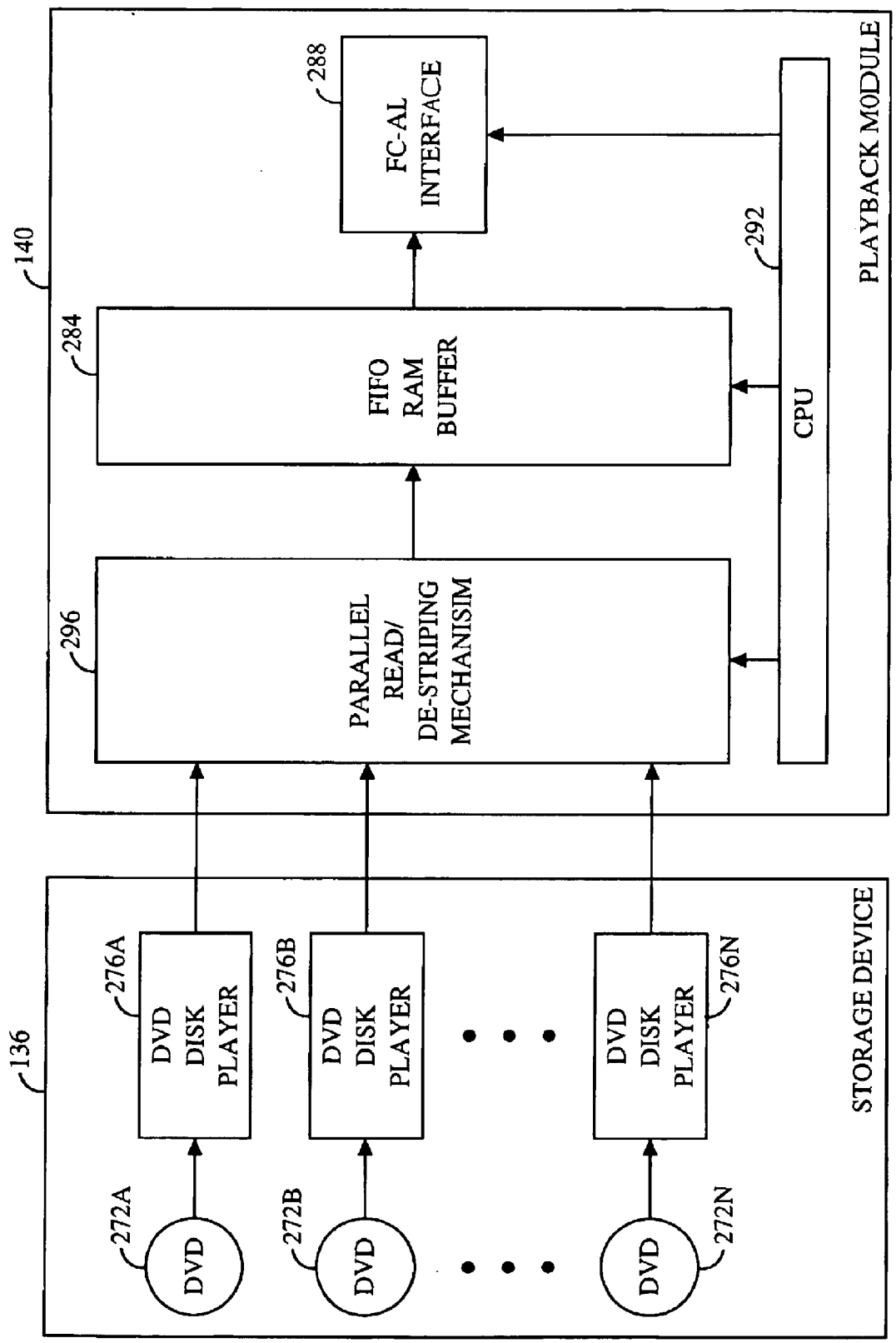
FIG. 9 is a block diagram of a storage device using multiple disk players in parallel and a playback player.

The set of single-play DVD disk players 276a, 276b, . . . 276n may also be played in a parallel mode, as illustrated in FIG. 9. In parallel mode, multiple DVD disk players 276a, 276b, . . . 276n play back different portions of compressed information, and the portions are later recombined in the playback module 140. The portions of compressed information are read from the DVD disk players 276a, 276b, . . . 276n to a parallel read/destriping mechanism 296, which properly sequences the portions of compressed information. In a preferred embodiment, the destriping mechanism 296 is a software module accessible by the playback module 140. As illustrated in FIG. 9, the destriping mechanism 296 is a software module accessed by the CPU 292 of the playback module 140. The destriping mechanism 296 may be resident in the CPU 292. The destriping mechanism 296 also performs error checking functions to ensure error-free playback. Portions of the compressed information may contain redundant information in case parts of the disk are unreadable or if some compressed information is corrupted. In such cases, the destriping mechanism 296 is able to use the redundant information to recreate any corrupted information. The redundant information and sequence information may be stored on a separate DVD disk, and read in parallel along with other disks of compressed information 272a, 272b, . . . 272n.

Figure 10:
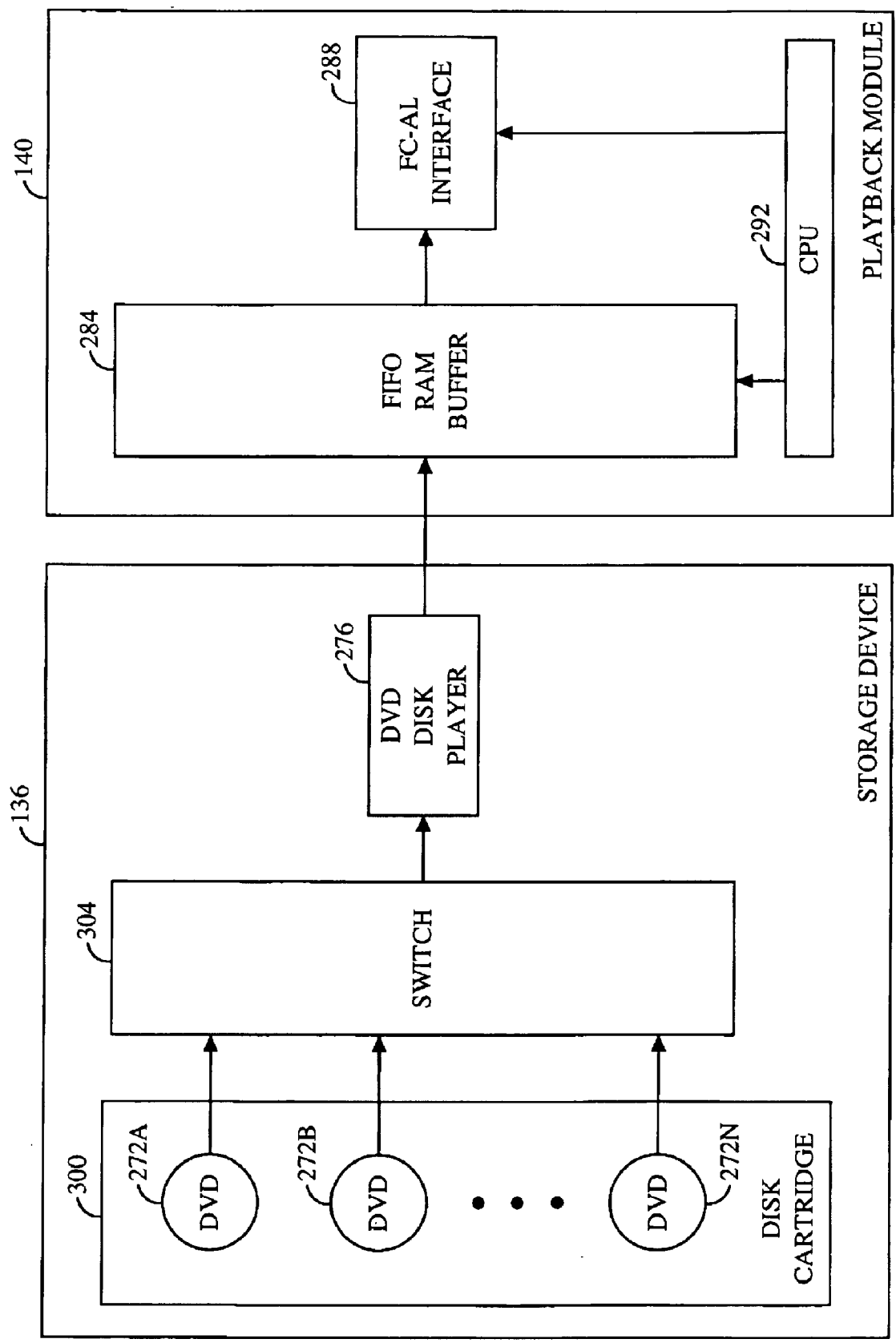
FIG. 10 is a block diagram of a storage device using a disk cartridge and a playback player.

In an alternate embodiment to either of the embodiments illustrated in FIGS. 8 and 9, a DVD disk cartridge may be used in place of the set of single-play DVD disks. Illustrated in FIG. 10, The DVD disk cartridge 300 is similar in operation to known CD disk cartridges. Multiple disks are inserted into the DVD disk cartridge 300. Software control resident in the storage device 136, the playback module 140, or the CPU 292 assures that the disks are properly installed and that the disks are accessed in the proper sequence. The multiple disks are be fed into a single DVD player. A switch mechanism 304, such as that in FIG. 8, controls which DVD disk is inserted into the DVD player. In the DVD disk cartridge embodiment, either serial or parallel playback may also be implemented.

Figure 11:
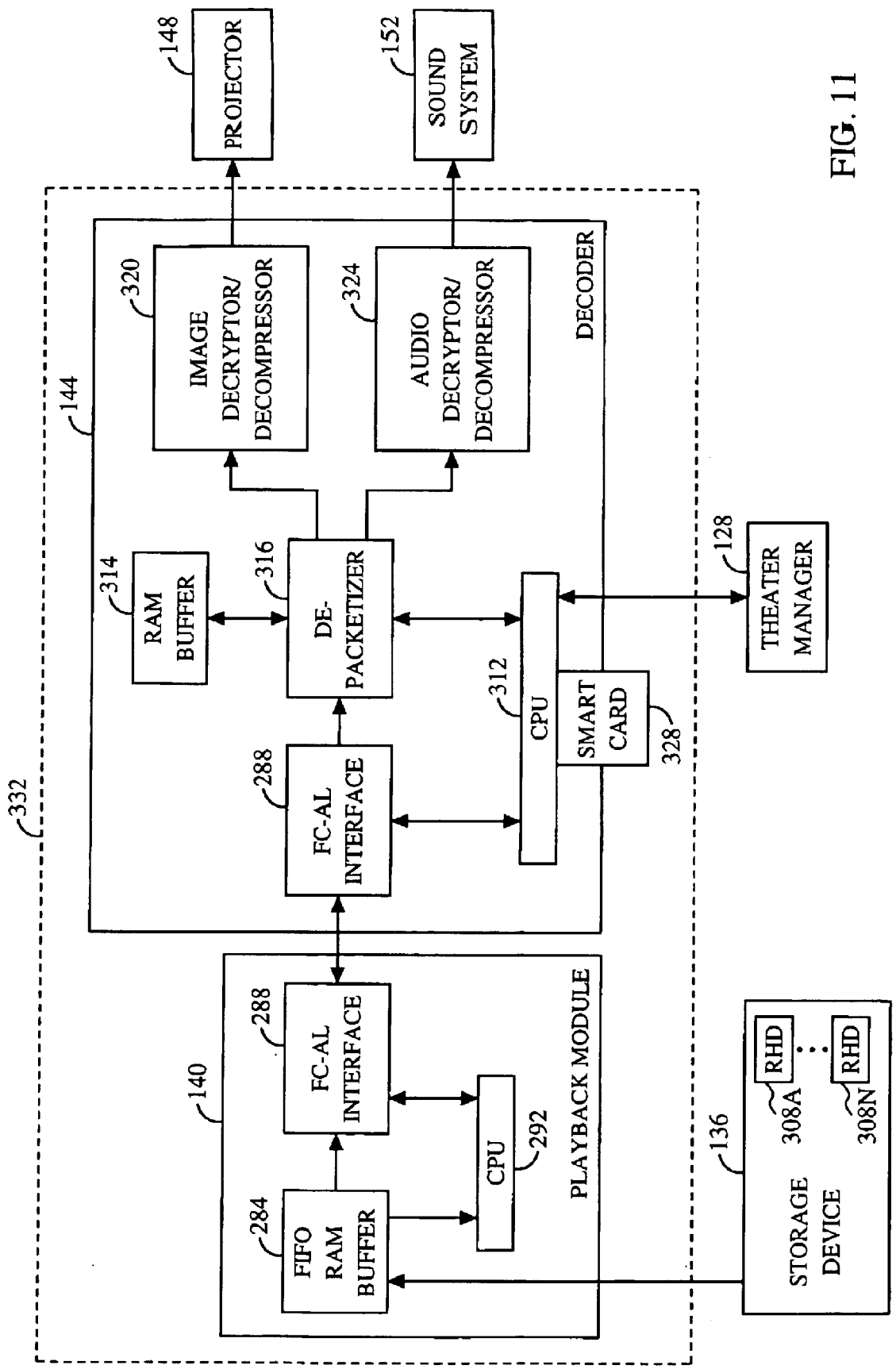
FIG. 11 is a block diagram of a theater subsystem using removable hard drives as the storage device.

FIG. 11 illustrates operation of the auditorium module 132 using one or more removable hard drives (RHDs) 308. For speed, capacity, and convenience reasons, it may be desirable to use more than one RHD 308. When reading data sequentially, some RHDs have a "prefetching" feature that anticipates a following read command based upon a recent history of commands. This prefetching feature is useful in that the time required to read sequential information off the disk is reduced. However, the time needed to read non-sequential information off the disk may be increased if the RHD receives a command that is unexpected. In such a case, the prefetching feature of the RHD may cause the random access memory of the RHD to be full, thus requiring more time to access the information requested. Accordingly, having more than one RHD is beneficial in that a sequential stream of data, such as an image program, may be read faster. Further, accessing a second set of information on a separate RHD disk, such as audio programs, trailers, control information, or advertising, is advantageous in that accessing such information on a single RHD is more time consuming.

Thus, compressed information is read from one or more RHDs 308 into a buffer 284. The FIFO-RAM buffer 284 in the playback module 140 receives the portions of compressed information from the storage device 136 at a predetermined rate. The FIFO-RAM buffer 284 is of a sufficient capacity such that the decoder 144, and subsequently the projector 148, is not overloaded or underloaded with information. In a preferred embodiment, the FIFO-RAM buffer 284 has a capacity of about 100 to 200 MB. Use of the FIFO-RAM buffer 284 is especially significant as there may be a several second delay when switching from one drive to another.

The portions of compressed information is output from the FIFO-RAM buffer into a network interface 288, which provides the compressed information to the decoder 144. In a preferred embodiment, the network interface 288 is a fiber channel arbitrated loop (FC-AL) interface.

In an alternate embodiment not specifically illustrated, a switch network controlled by the theater manager 128 receives the output data from the playback module 140 and directs the data to a given decoder 144. Use of the switch network allows programs on any given playback module 140 to be transferred to any given decoder 144.

When a program is to be viewed, the program information is retrieved from the storage device 136 and transferred to the auditorium module 132 via the theater manager 128. The decoder 144 decrypts the data received from the storage device 136 using secret key information provided only to authorized theaters, and decompresses the stored information using the decompression algorithm which is inverse to the compression algorithm used at source generator 108. The decoder 144 converts the decompressed image information to a standard video format used by the projection system (which may be either an analog or digital format) and the image is displayed through an electronic projector 148. The audio information is also decompressed and provided to the auditorium's sound system 152 for playback with the image program.

A block diagram of the decoder 144 is also illustrated in FIG. 11. The decoder 144 processes a compressed/encrypted program to be visually projected onto a screen or surface and audibly presented using the sound system 152. The decoder 144 is controlled by its controller 312 or via the theater manager 128, and comprises at lest one depacketizer 316, the controller, or CPU 312, a buffer 314, an image decryptor/decompressor 320, and an audio decryptor/decompressor 324. The buffer may temporarily store information for the depacketizer 316. All of the may be implemented on one or more circuit card assemblies. The circuit card assemblies may be installed in a self-contained enclosure that mounts on or adjacent to the projector 148. Additionally, a cryptographic smart card 328 may be used which interfaces with controller 312 and/or image decryptor/decompressor 320 for transfer and storage of unit-specific cryptographic keying information.

The depacketizer 316 identifies and separates the individual control, image, and audio packets that arrive from the playback module 140, the CPU 312 and/or the theater manager 128. Control packets may be sent to the theater manager 128 while the image and audio packets are sent to the image and audio decryption/decompression systems 320 and 324, respectively. Read and write operations tend to occur in bursts. Therefore, large buffers 314 are used to stream data smoothly from the depacketizer 316 directly to the projection equipment.

The theater manager 128 configures, manages the security of, operates, and monitors the theater subsystem 104. This includes the external interfaces, image and audio decryption/decompression modules 320 and 324, along with projector 148 and the sound module 152. Control information comes from the playback module 140, the CPU 312, the theater manager system 128, a remote control port, or a local control input, such as a control panel on the outside of the auditorium module 132 housing or chassis. The decoder CPU 312 may also manage the electronic keys assigned to each auditorium module 132. Pre-selected electronic cryptographic keys assigned to auditorium module 132 are used in conjunction with the electronic cryptographic key information that is embedded in the image and audio data to decrypt the image and audio information before the decompression process. In a preferred embodiment, decoder CPU 312 uses a standard microprocessor running embedded in the software of each auditorium module 132, as a basic functional or control element.

In addition, the decoder controller 312 is preferably configured to work or communicate certain information with theater manager 128 to maintain a history of presentations occurring in each auditorium. Information regarding this presentation history is then available for transfer to the hub 102 using the return link, or through a transportable medium at preselected times.

The image decryptor/decompressor 320 takes the image data stream from depacketizer 316, performs decryption, and reassembles the original image for presentation on the screen. The output of this operation generally provides standard analog RGB signals to digital cinema projector 148. Typically, decryption and decompression are performed in real-time, allowing for real-time playback of the programming material.

The image decryptor/decompressor 320 decrypts and decompresses the image data stream to reverse the operation performed by the image compressor 184 and the image encryptor 188 of the hub 102. Each auditorium module 132 may process and display a different program from other auditorium modules 132 in the same theater subsystem 104 or one or more auditorium modules 132 may process and display the same program simultaneously. Optionally, the same program may be displayed on multiple projectors, the multiple projectors being delayed in time relative to each other.

The decryption process uses previously provided unit-specific and program-specific electronic cryptographic key information in conjunction with the electronic keys embedded in the data stream to decrypt the image information. (The decryption process has previously been described with reference to FIG. 4.) Each theater subsystem 104 is provided with the necessary cryptographic key information for all programs authorized to be shown on each auditorium module 132.

A multi-level cryptographic key manager is used to authorize specific presentation systems for display of specific programs. This multi-level key manager typically utilizes electronic key values which are specific to each authorized theater manager 128, the specific image and/or audio program, and/or a time varying cryptographic key sequence within the image and/or audio program. An "auditorium specific" electronic key, typically 56 bits or longer, is programmed into each auditorium module 132.

This programming may be implemented using several techniques to transfer and present the key information for use. For example, the return link discussed above may be used through a link to transfer the cryptographic information from the conditional access manager 124. Alternatively, smart card technology such as smart card 328, pre-programmed flash memory cards, and other known portable storage devices may be used.

For example, the smart card 328 may be designed so that this value, once loaded into the card, cannot be read from the smart card memory. Physical and electronic security measures are used to prevent tampering with this key information and to detect attempted tampering or compromise. The key is stored in such a way that it can be erased in the event of detected tampering attempts. The smart card circuitry includes a microprocessor core including a software implementation of an encryption algorithm, typically Data Encryption Standard (DES). The smart card can input values provided to it, encrypt (or decrypt) these values using the onward DES algorithm and the pre-stored auditorium specific key, and output the result. Alternatively, the smart card 328 may be used simply to transfer encrypted electronic keying information to circuitry in the theater subsystem 104 which would perform the processing of this key information for use by the image and audio decryption processes.

Image program data streams undergo dynamic image decompression using an inverse ABSDCT algorithm or other image decompression process symmetric to the image compression used in the central hub compressor/encryptor 112. If image compression is based on the ABSDCT algorithm the decompression process includes variable length decoding, inverse frequency weighting, inverse differential quad-tree transformation, IDCT, and DCT block combiner deinterleaving. The processing elements used for decompression may be implemented in dedicated specialized hardware configured for this function such as an ASIC or one or more circuit card assemblies. Alternatively, the decompression processing elements may be implemented as standard elements or generalized hardware including a variety of digital signal processors or programmable electronic devices or computers that operate under the control of special function software or firmware programming. Multiple ASICs may be implemented to process the image information in parallel to support high image data rates.

The decompressed image data goes through digital to analog conversion, and the analog signals are output to projector the 148. Alternatively, a digital interface may be used to convey the decompressed digital image data to the projector 148 obviating the need for the digital-to-analog process.

The audio decryptor/decompressor 324 takes the audio data stream from the depacketizer 316, performs decryption, and reassembles the original audio for presentation on a theater's speakers or audio sound system 152. The output of this operation provides standard line level audio signals to the sound system 152.

Similar to the image decryptor/decompressor 320, the audio decryptor/decompressor 324 reverses the operation performed by the audio compressor 192 and the audio encryptor 196 of the hub 102. Using electronic keys from the cryptographic smart card 328 in conjunction with the electronic keys embedded in the data stream, the decryptor 324 decrypts the audio information. The decrypted audio data is then decompressed.

Audio decompression is performed with an algorithm symmetric to that used at the central hub 102 for audio compression. Multiple audio channels, if present, are decompressed. The number of audio channels is dependent on the multiphonic sound system design of the particular auditorium, or presentation system. Additional audio channels may be transmitted from the central hub 102 for enhanced audio programming for purposes such as multi-language audio tracks and audio cues for sight impaired audiences. The system may also provide additional data tracks synchronized to the image programs for purposes such as multimedia special effects tracks, subtitling, and special visual cue tracks for hearing impaired audiences.

As discussed earlier, audio and data tracks may be time synchronized to the image programs or may be presented asynchronously without direct time synchronization. Image programs may consist of single frames (i.e., still images), a sequence of single frame still images, or motion image sequences of short or long duration.

If necessary, the audio channels are provided to an audio delay element, which inserts a delay as needed to synchronize the audio with the appropriate image frame. Each channel then goes through a digital to analog conversion to provide what are known as "line level" outputs to sound system 152. That is, the appropriate analog level or format signals are generated from the digital data to drive the appropriate sound system. The line level audio outputs typically use standard XLR or AES/EBU connectors found in most theater sound systems.

The projector 148 presents the electronic representation of a program on a screen. The high quality projector is based on advanced technology, such as liquid crystal light valve (LCLV) methods for processing optical or image information. The projector 148 receives an image signal from image decryptor/decompressor 320, typically in standard Red-Green-Blue (RGB) video signal format. Information transfer for control and monitoring of the projector 148 is typically provided over a digital serial interface from the controller 312.

Referring back to FIG. 11, the decoder chassis 144 includes a fiber channel interface 288, the depacketizer 316, the decoder controller or CPU 312, the image decryptor/decompressor 320, the audio decryptor/decompressor 324, and the cryptographic smart card 328. The decoder chassis 144 is a secure, self-contained chassis that also houses the encryption smart card 328 interface, internal power supply and/or regulation, cooling fans (as necessary), local control panel, and external interfaces. The local control panel may use any of various known input devices such as a membrane switch flat panel with embedded LED indicators. The local control panel typically uses or forms part of a hinged access door to allow entry into the chassis interior for service or maintenance. This door has a secure lock to prevent unauthorized entry, theft, or tampering of the system. During installation, the smart card 328 containing the encryption keying information (the auditorium specific key) is installed inside the decoder chassis 144, secured behind the locked front panel. The cryptographic smart card slot is accessible only inside the secured front panel. The RGB signal output from the image decryptor/decompressor 320 to the projector 148 is connected securely within the decoder chassis 144 in such a way that the RGB signals cannot be accessed while the decoder chassis 144 is mounted to the projector housing. Security interlocks may be used to prevent operation of the decoder 144 when it is not correctly installed to the projector 148.

The sound system 152 presents the audio portion of a program on the theater's speakers. In a preferred embodiment, the sound system 152 receives up to 12 channels of standard format audio signals, either in digital or analog format, from the audio decryptor/decompressor 324

In another embodiment, the playback module 140 and the decoder 144 are integrated into a single playback-decoder unit 332. Combining the playback module 140 and the decoder module 148 results in cost and access time savings in that only a single CPU (292 or 312) is needed to serve the functions of both the playback module 140 and the decoder 144. Combination of the playback module 140 and the decoder 144 also does not require the use of a fiber channel interface 288.

If multiple viewing locations are desired, information on any storage device 136 is configured to transfer compressed information of a single image program to different auditoriums with preselected programmable offsets or delays in time relative to each other. These preselected programmable offsets are made substantially equal to zero or very small when a single image program is to be presented to selected multiple auditoriums substantially simultaneously. At other times, these offsets can be set anywhere from a few minutes to several hours, depending on the storage configuration and capacity, in order to provide very flexible presentation scheduling. This allows a theater complex to better address market demands for presentation events such as first run films.

Figure 13:
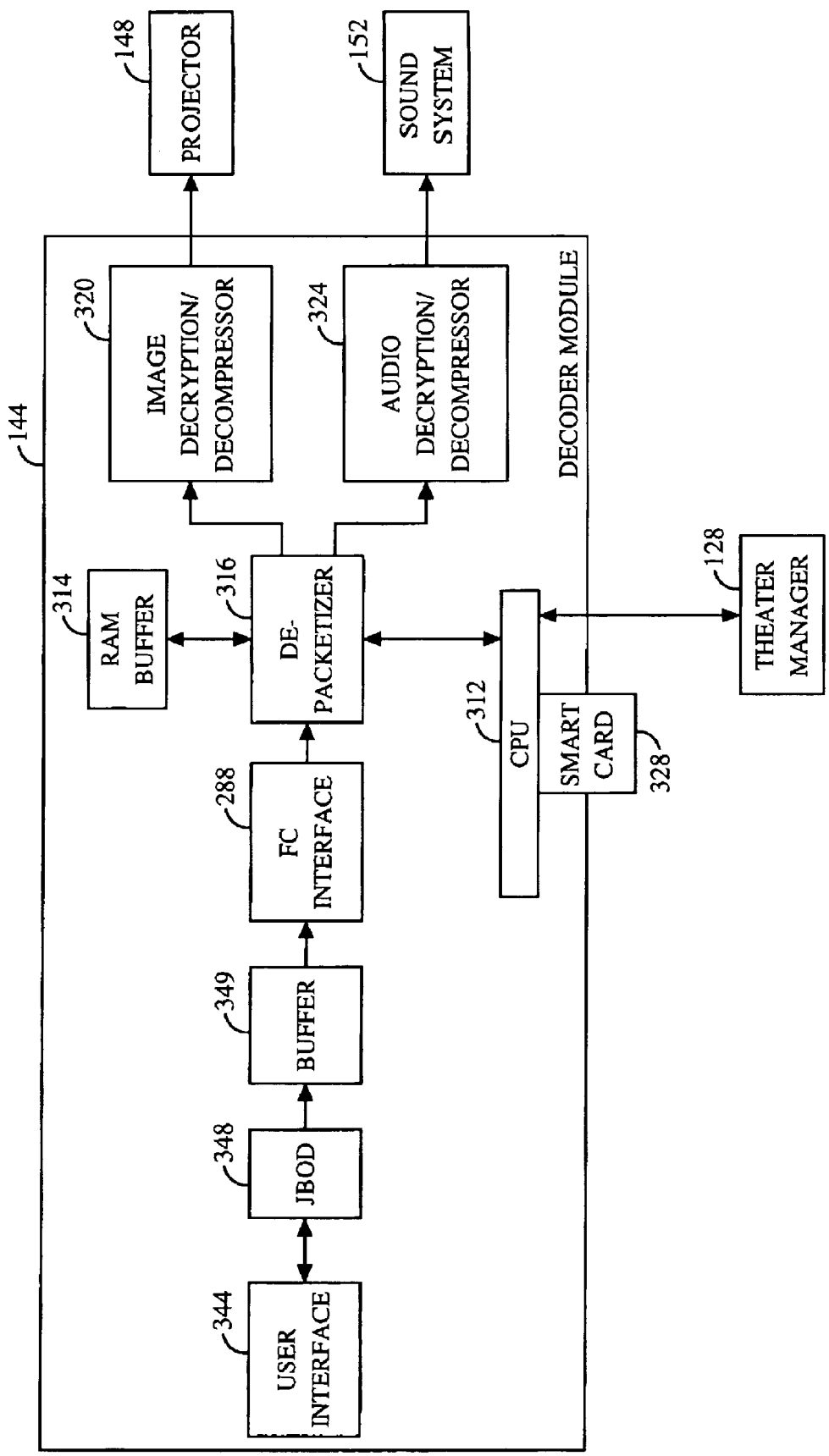
FIG. 13 is a block diagram of a theater subsystem using a JBOD module as the storage device.

FIG. 13 illustrates another embodiment of the invention. The user interface 344 allows direct control over the decoder 144, along with the projector 148 and audio system 152. The JBOD (just a bunch of drives) 348 comprises magnetic storage mediums, such as a bank of hard disk drives, that store encrypted/compressed encoded information for scheduled playback periods in designated auditoriums. The JBOD 348 is designed to be scaleable to efficiently support the storage requirements of each theater. Further, each JBOD 348 includes built-in redundancy to prevent loss of stored programming information in the event of a storage unit failure. Each JBOD 348 may, for example, be a rack-mounted system that is expandable to accommodate the varying storage requirements of each theater system. The use of the JBOD 348 allows the theater manager 128 to dynamically route program showings to the various screens in a theater complex, and to schedule pre-feature programming. This is accomplished in a highly flexible manner useful to respond quickly to changing needs or market demands.

In a preferred embodiment, each JBOD 348 is designed with a capacity for storage equal to that needed to store programs for its auditorium location. Thus, more than one feature may be shown on the same screen in the same day (double feature). In addition, adequate storage is provided so that future programs may be stored prior to their showing authorization date while still storing the currently "authorized for showing" programs. This amount of available storage capacity allows for programs to be authorized for future showing to be transmitted hours, days or weeks prior to the authorization to playback and display such programs without affecting the ability to playback and display the presently authorized programs. It has been estimated that in terms of digital data storage capacity, on the order of about 120 GigaBytes of storage capacity per auditorium is used in this type of arrangement. This capacity is assuming the use of current compression and image technology, which may change to allow reduced requirements in the near future.

Disk storage space is dynamically allocated for each program loaded into the JBOD 348. This concept works for larger theaters with multiple screens because the short and long programs average out to a nominal length, typically of around two hours. As a guideline for single screen theaters, the storage capacity should be sufficient to store the longest programs.

The JBOD 348 is also configured or configurable to operate in a "striping" mode where received information is striped across the array and temporarily stored in a RAM buffer 349. That is, received data that is to be stored is directed in part to different ones of the drives during storage. Part of the input data is transferred to one drive while a subsequent portion is transferred to the next drive and so forth. After sufficient latency time to allow a drive to write data, a given drive can again be scheduled to receive input data. Therefore, received data is segregated into smaller components or segments, each of which is stored at the maximum (or a high) rate allowed by each drive on separate drives, taking advantage of input buffering or memory storage available in the drive input channel. This allows slower transfer rate devices to essentially pull in data in parallel and, therefore, accomplish a very high transfer rate. This type of storage also provides error protection redundancy.

The storage of data on drives, or other storage devices, utilizes parity information that allows the program to be reconstituted upon retrieval. That is, a means is provided for linking the program portions together again at time of retrieval or presentation.

In a preferred embodiment, each JBOD 348 is based on a Redundant Array of Inexpensive Devices (RAID) array design with recovery capability of an entire data file if a disk drive in the array fails. The JBOD 348 provides status and warning indicators to assist in trouble shooting or fault isolation. Remote status, control, and diagnostics may be available with this type of design.

Figure 12:
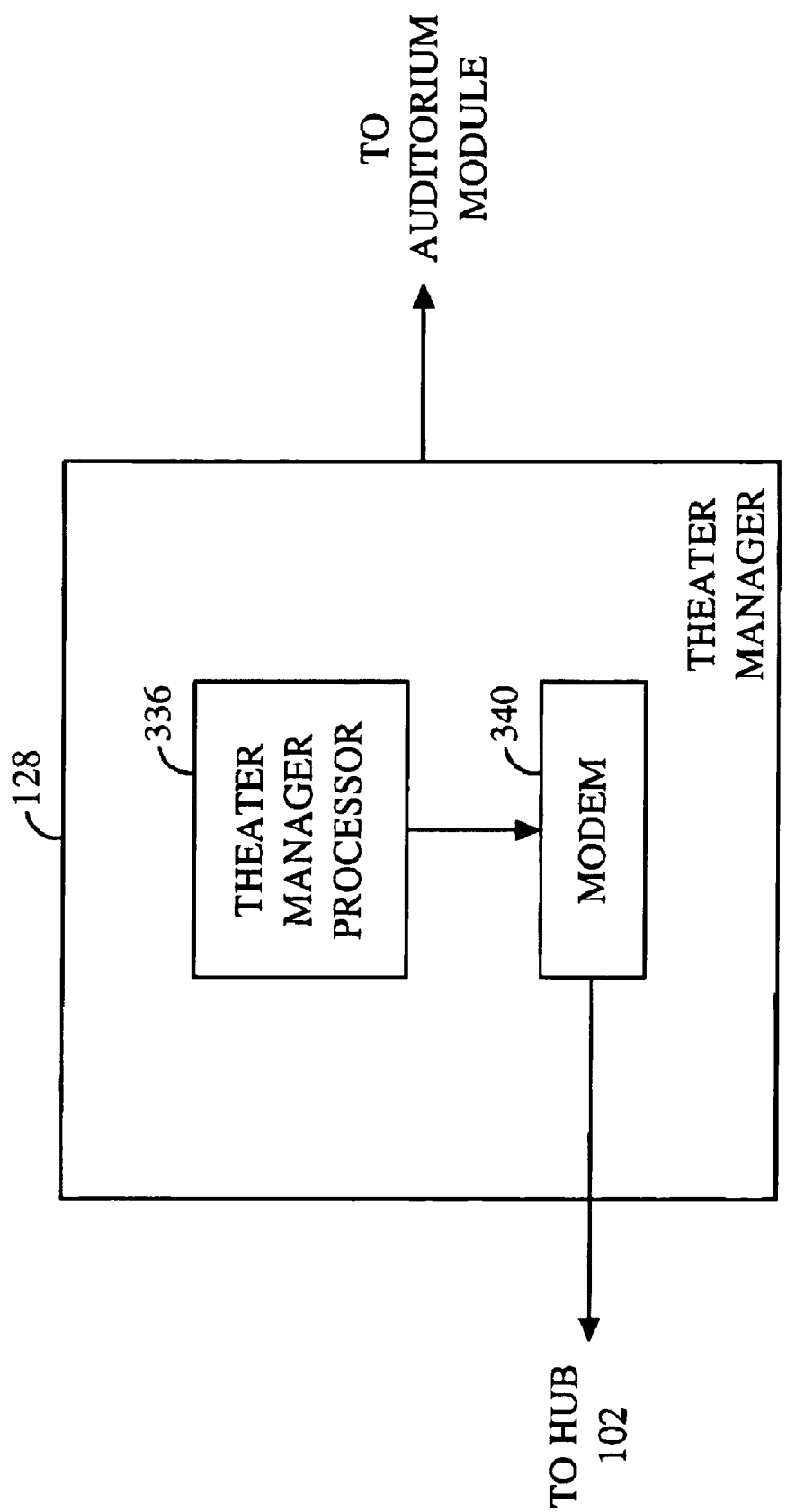
FIG. 12 is a block diagram of a theater manager.

The theater manager 128 is illustrated in FIG. 12. The theater manager 128 provides operational control and monitoring of the entire presentation or theater subsystem 104, or one or more auditorium modules 132 within a theater complex. The theater manager 128 may also use a program control means or mechanism for creating program sets from one or more received individual image and audio programs, which are scheduled for presentation on an auditorium system during an authorized interval.

The theater manager 128 comprises a theater manager processor 336 and may optionally contain at least one modem 340, or other device that interfaces with a return link, for sending messages back to central hub 102. The theater manager 128 may include a visual display element such as a monitor and a user interface device such as a keyboard, which may reside in a theater complex manager's office, ticket booth, or any other suitable location that is convenient for theater operations.

The theater manager processor 336 is generally a standard commercial or business grade computer. Referring to FIG. 12 with reference to FIG. 2, the theater manager processor 336 communicates with the network manager 120 and conditional access manager 124. In a preferred embodiment, the modem 340 is used to communicate with the central hub 102. The modem 340 is generally a standard phone line modem that resides in or is connected to the processor, and connects to a standard two-wire telephone line to communicate back to the central hub 102. In alternative embodiments, communications between the theater manager processor 336 and the central hub 102 may be sent using other low data rate communications methods such as Internet, private or public data networking, wireless, or satellite communication systems. For these alternatives, the modem 340 is configured to provide the appropriate interface structure.

Referring back to FIG. 2, the theater manager 128 allows each auditorium module 132 to communicate with each storage device 136. A theater management module interface may include a buffer memory such that information bursts may be transferred at high data rates from the theater storage device 136 using the theater manager interface 126 and processed at slower rates by other elements of the auditorium module 132.

Information communicated between the theater manager 128 and the network manager 120 and/or the conditional access manager 124 include requests for retransmission of portions of information received by the theater subsystem 104 that exhibiting uncorrectable bit errors, monitor and control information, operations reports and alarms, and cryptographic keying information. Messages communicated may be cryptographically protected to provide eavesdropping type security and/or verification and authentication.

The theater manager 128 may be configured to provide fully automatic operation of the presentation system, including control of the playback/display, security, and network management functions. The theater manager 128 may also provide control of peripheral theater functions such as ticket reservations and sales, concession operations, and environmental control. Alternatively, manual intervention may be used to supplement control of some of the theater operations. The theater manager 128 may also interface with certain existing control automation systems in the theater complex for control or adjustment of these functions. The system to be used will depend on the available technology and the needs of the particular theater, as would be known.

Through either control of theater manager 128 or the network manager 120, the invention generally supports simultaneous playback and display of recorded programming on multiple display projectors. Furthermore, under control of theater manager 128 or the network manager 120, authorization of a program for playback multiple times can often be done even though theater subsystem 104 only needs to receive the programming once. Security management may control the period of time and/or the number of playbacks that are allowed for each program.

Through automated control of the theater manager 128 by the network management module 112, a means is provided for automatically storing, and presenting programs. In addition, there is the ability to control certain preselected network operations from a location remote from the central facility using a control element. For example, a television or film studio could automate and control the distribution of films or other presentations from a central location, such as a studio office, and make almost immediate changes to presentations to account for rapid changes in market demand, or reaction to presentations, or for other reason understood in the art.

Referring back to FIG. 2, the theater subsystem 104 may be connected with the auditorium module 132 using the theater interface network 126. The theater interface network 126 comprises of a local area network (electric or optical) which provides for local routing of programming at the theater subsystem 104. The programs are stored in each storage device 136 and are routed through the theater interface network 126 to one or more of the auditorium system(s) 132 of the theater subsystem 104. The theater interface network 126 may be implemented using any of a number of standard local area network architectures which exhibit adequate data transfer rates, connectivity, and reliability such as arbitrated loop, switched, or hub-oriented networks.

Still referring to FIG. 2, each storage device 136 provides for local storage of the programming material that it is authorized to playback and display. In an embodiment, the storage system is centralized at each theater system. The theater storage device 136 allows the theater subsystem 104 to create presentation events in one or more auditoriums and may be shared across several auditoriums at one time.

Depending upon capacity, the theater storage device 136 may store several programs at a time. The theater storage device 136 may be connected using a local area network in such a way that any program may be played back and presented on any authorized presentation system (i.e., projector). Also, the same program may be simultaneously played back on two or more presentation systems.

Accordingly, an apparatus and method is provided for the encoding, compression, encryption, and storage of image and/or audio information. The apparatus and method allows for the flexible scheduling of feature films and advertisements, the integration of audio and image signals, and easy implementation of security measures, among other features and advantages.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. An apparatus for the encoding and storage of signals representing image and audio information onto a plurality of storage media, the apparatus comprising:

a source generator configured to convert the signals into digitized image and audio information;

a compressor configured to receive the digitized image and audio information from the source generator and to compress the digitized image and audio information;

an encryptor configured to receive the compressed digitized image and audio information from the compressor and to encrypt the compressed digitized image and audio information;

means for stripping the encrypted compressed digitized image and audio information into a plurality of portions; and a storage device configured to receive the portions of the encrypted compressed digitized image and audio information and distributively store the portions of the encrypted compressed digitized image and audio information onto the plurality of storage media.

2. The apparatus of claim 1, wherein the portions of the image and audio information are stored in a non-contiguous manner independent of each other.

3. The apparatus of claim 1, wherein the compressor uses an adaptive block sized discrete cosine transform compression technique.

4. The apparatus of claim 1, wherein the compressor is configured to compress the digitized audio information at a variable rate.

5. The apparatus of claim 1, wherein the encrypted compressed digitized image information forms at least one image program, wherein the encrypted compressed digitized audio information forms at least one audio program, and further comprising an identifier, wherein the compressor is configured to link the identifier to one or more audio programs with at least one image program.

6. The apparatus of claim 5, wherein the source generator further includes a program packetizer, wherein the program packetizer is configured to organize image information or audio information into identifiable groups for storage onto the storage media.

7. The apparatus of claim 1, wherein the source generator further comprises a telecine device.

8. The apparatus of claim 1, wherein the source generator further comprises a computer based workstation.

9. The apparatus of claim 1, wherein the encryptor further comprises a cryptographic key, the cryptographic key being stored on a key storage medium, and the cryptographic key being necessary for decryption of the image and audio information.

10. The apparatus of claim 9, wherein the key storage medium is a smart card.

11. The apparatus of claim 9, wherein the key storage medium is a magnetic disk.

12. The apparatus of claim 9, wherein the cryptographic key is transmitted.

13. The apparatus of claim 9, further comprising means for indicating a time interval over which the cryptographic key information is valid and for assuring that the cryptographic key information is only used during that interval.

14. The apparatus of claim 13, wherein the cryptographic key is configured to be overwritten from the key storage medium after the time interval expires.

15. The apparatus of claim 1, wherein the encryptor further comprises at least one watermark, wherein the watermark is perceptually unnoticeable during presentation of the image or audio information at a predefined normal rate of transfer, but is detectable when said image or audio information is presented at a rate substantially different from said normal rate.

16. The apparatus of claim 15, wherein the watermark identifies presentation time and location information associated with the image or audio information.

17. The apparatus of claim 1, further comprising a network manager, wherein the network manager is configured to send control information to and receives status information from the source generator, the compressor, the encryptor and the storage device.

18. The apparatus of claim 1, wherein the apparatus is configured to establish a link, wherein the link is configured to send and receive information external from the apparatus.

19. The apparatus of claim 18, wherein the information comprises control and status information.

20. The apparatus of claim 18, wherein the information comprises updates to the image and audio information.

21. The apparatus of claim 18, wherein the link comprises a dedicated telephone data link.

22. The apparatus of claim 18, wherein the link comprises a dialup telephone data link.

23. The apparatus of claim 18, wherein the link comprises a packet type data link.

24. The apparatus of claim 18, wherein the link comprises an Internet based link.

25. The apparatus of claim 18, wherein the link comprises a wireless data link.

26. The apparatus of claim 18, wherein said the link comprises a satellite based data link.

27. The apparatus of claim 1, wherein the storage media comprise at least one optical storage medium.

28. The apparatus of claim 27, wherein the storage media comprise multiple optical storage media, and wherein image and audio information are stored non-sequentially on the multiple optical storage media.

29. The apparatus of claim 27, wherein the audio information is stored on a separate optical storage media than the image information.

30. The apparatus of claim 27, further comprising encoded signals representing promotional information, and wherein the encoded signals representing promotional information is stored on separate optical storage media than the image information and the audio information.

31. The apparatus of claim 27, wherein the storage media comprise at least one DVD disk.

32. The apparatus of claim 1, wherein the storage media comprise at least one magnetic storage medium.

33. The apparatus of claim 32, wherein the storage media include multiple magnetic storage media, and wherein image and audio information are stored non-sequentially on the multiple magnetic storage media.

34. The apparatus of claim 32, wherein the audio information is stored on separate magnetic storage media than the image information.

35. The apparatus of claim 32, further comprising encoded signals representing promotional information, and wherein the encoded signals representing promotional information is stored on separate magnetic storage media than the image information and the audio information.

36. The apparatus of claim 32, wherein the storage media comprise at least removable hard drive.

37. The apparatus of claim 32, wherein the storage media comprise at least one JBOD module, wherein the JBOD module comprises at least one storage component.

38. The apparatus of claim 1, wherein the storage device comprises means for using identifier information to link different preselected portions of image or audio information to different ones of the storage mediums during storage.

39. The apparatus of claim 1, wherein the theater storage device further comprises means for providing parallel striping information such that stored portions of the image and audio information may be accessed at a desired data transfer rate and to provide error protection redundancy.

40. The apparatus of claim 1, further comprising at least one local area network interface, wherein at least the source generator, the compressor, the encryptor and the storage device are interconnected by the at least one local area network interface.

41. The apparatus of claim 40, wherein the network interface comprises an ethernet network.

42. The apparatus of claim 1, wherein the image information is provided in the form of image programs, wherein the image programs are in the form of either a single still frame or series-of frames shown as motion pictures of varying length.

43. The apparatus of claim 1, further comprising means for archiving the storage of image and audio information.

44. The apparatus of claim 1, wherein the source generator further comprises a cue track, wherein the cue track is configured to indicate a specific portion of a program where information may be linked.

45. An apparatus for the encoding and storage of signals representing image information and audio information onto a plurality of storage media, the apparatus comprising:
    a source generator configured to convert the signals into digitized image information and digitized audio information;
    a compressor configured to receive the digitized image information and digitized audio information from the source generator and to compress the digitized image information and the digitized audio information, the compressor using an adaptive block sized discrete cosine transform compression technique;
    an encryptor configured to receive the compressed digitized image information and the compressed digitized audio information from the compressor and to encrypt the compressed digitized image information and the compressed digitized audio information; and
    a storage device configured to receive the encrypted compressed digitized image information and the encrypted compressed digitized audio information from the compressor, and distributively store the encrypted compressed digitized image information as an image program onto the plurality of storage media and distributively store the encrypted compressed digitized audio information as an audio program onto another plurality of storage media.

46. The apparatus of claim 45, wherein the storage media includes is at least one JBOD module, each JBOD module having at least one storage component, and wherein the image and audio information is stored non-sequentially on the storage components of each JBOD module.

47. The apparatus of claim 45, further comprising encoded signals representing promotional information, and wherein the encoded signals representing promotional information is stored on a separate storage component than the image information and the audio information.

48. A method for encoding and storing signals representing image and audio information onto a plurality of storage media, the method comprising:
    converting the signals into digitized image and audio information;
    compressing the digitized image and audio information;
    encrypting the compressed digitized image and audio information;
    stripping the encrypted compressed digitized image and audio information into a plurality of portions; and
    distributively storing the portions of the encrypted compressed digitized image and audio information onto a plurality of storage media.

49. The method of claim 48, wherein the compressed image and audio information are each stored in a non-contiguous manner independent of each other.

50. The method of claim 48, wherein said compressing uses an adaptive block sized discrete cosine transform compression technique.

51. The method of claim 48, wherein said compressing the digitized audio information occurs at a variable rate.

52. The method of claim 48, further comprising:
    grouping the encrypted compressed digitized image information into at least one image program;
    grouping the encrypted compressed digitized audio information into at least one audio program; and
    linking one or more audio programs with at least one image program.

53. The method of claim 48, wherein said converting uses a telecine device.

54. The method of claim 48, wherein said converting uses a computer based workstation.

55. The method of claim 44, further comprising generating a cryptographic key, wherein the cryptographic key is stored on a key storage medium, and the cryptographic key is necessary for decryption of the image and audio information.

56. The method of claim 55, wherein the key storage medium includes a smart card.

57. The method of claim 55, wherein the key storage medium includes a magnetic disk.

58. The method of claim 55, wherein the cryptographic key is transmitted.

59. The method of claim 55, further comprising indicating a time interval over which the cryptographic key information is valid and for assuring that the cryptographic key information is only used during that interval.

60. The method of claim 59, further comprising overwriting the cryptographic key from the key storage medium after the time interval expires.

61. The method of claim 48, further comprising generating at least one watermark, wherein the watermark is perceptually unnoticeable during presentation of decompressed image or audio information at a predefined normal rate of transfer, but is detectable when said image or audio information is presented at a rate substantially different from said normal rate.

62. The method of claim 61, wherein the watermark identifies presentation time and location information associated with the image or audio information.

63. The method of claim 48, further comprising providing a network manager, wherein the network manager sends and receives control information regarding said generating, compressing, encrypting and storing.

64. The method of claim 48, further comprising establishing a link to send and receive information.

65. The method of claim 64, wherein the information comprises status and control information.

66. The method of claim 64, wherein the information comprises updates to the image signals and audio programs.

67. The method of claim 64, wherein the link is a dedicated telephone data link.

68. The method of claim 64, wherein the link is a dialup telephone data link.

69. The method of claim 64, wherein the link is a packet type data link.

70. The method of claim 64, wherein the link is an Internet based link.

71. The method of claim 64, wherein the link is a wireless data link.

72. The method of claim 64, wherein said the link is a satellite based data link.

73. The method of claim 48, wherein the storage media comprise at least one optical storage medium.

74. The method of claim 73, wherein the storage media include multiple optical storage media, and wherein image and audio information are stored non-sequentially on the multiple optical storage media.

75. The method of claim 73, wherein the audio information is stored on separate optical storage media than the image information.

76. The method of claim 73, further comprising storing promotional information, wherein the promotional information is stored on separate optical storage media than the image information or the audio information.

77. The method of claim 73, wherein the storage media include at least one DVD disk.

78. The method of claim 48, wherein the storage media include at least one magnetic storage medium.

79. The method of claim 78, wherein the storage media include multiple magnetic storage media, and wherein image and audio information are stored non-sequentially on the multiple magnetic storage media.

80. The method of claim 78, wherein the audio information is stored on separate magnetic storage media than the image information.

81. The method of claim 78, further comprising storing promotional information, wherein the promotional information is stored on separate magnetic storage media than the image information and the audio information.

82. The method of claim 78, wherein the storage media include at least one removable hard drive.

83. The method of claim 78, wherein the storage media include at least one JBOD module, wherein the JBOD module comprises at least one storage component.

84. The method of claim 48, further comprising using identifier information to link different preselected portions of image or audio information to different ones of the storage media during said storing.

85. The method of claim 48, further comprising providing parallel striping information such that stored portions of the image and audio information may be accessed at a desired data transfer rate and to provide error protection redundancy.

86. The method of claim 48, further comprising providing at least one local area network interface.

87. The method of claim 86, wherein the network interface is an Ethernet network.

88. The method of claim 48, wherein the image information is provided in the form of image programs, wherein the image programs are in the form of either a single still frame or series of frames shown as motion pictures of varying length.

89. The method of claim 48, further comprising archiving the storage of image and audio information.

90. The method of claim 48, further comprising cueing a specific portion of a program where information may be linked.

* * * * *